United States Patent
Toyama et al.

(10) Patent No.: US 10,005,849 B2
(45) Date of Patent: *Jun. 26, 2018

(54) PROCESS FOR PRODUCING CELLULOSE DERIVATIVE AND CELLULOSE DERIVATIVE

(71) Applicant: NEC Corporation, Tokyo (JP)

(72) Inventors: Kiyohiko Toyama, Tokyo (JP); Masatoshi Iji, Tokyo (JP); Shukichi Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/030,936

(22) PCT Filed: Oct. 7, 2014

(86) PCT No.: PCT/JP2014/076787
§ 371 (c)(1),
(2) Date: Apr. 21, 2016

(87) PCT Pub. No.: WO2015/060122
PCT Pub. Date: Apr. 30, 2015

(65) Prior Publication Data
US 2016/0251452 A1    Sep. 1, 2016

(30) Foreign Application Priority Data

Oct. 25, 2013 (JP) ................. 2013-222565

(51) Int. Cl.
*C08B 3/16* (2006.01)
*C08L 1/14* (2006.01)
*C08L 67/02* (2006.01)

(52) U.S. Cl.
CPC ............... *C08B 3/16* (2013.01); *C08L 1/14* (2013.01); *C08L 67/02* (2013.01)

(58) Field of Classification Search
CPC ..................................... C08B 3/16; C08L 1/14
USPC .................................. 536/64, 65, 115, 124
See application file for complete search history.

(56) References Cited

U.S. PATENT DOCUMENTS

| 8,524,887 | B2 * | 9/2013 | Buchanan | C08B 1/003 |
| | | | | 536/124 |
| 9,382,335 | B2 * | 7/2016 | Toyama | C08B 3/00 |
| 2012/0108805 | A1 | 5/2012 | Nozoe | |
| 2012/0196998 | A1 | 8/2012 | Iji et al. | |
| 2012/0202926 | A1 * | 8/2012 | Iji | C08B 3/10 |
| | | | | 524/41 |

FOREIGN PATENT DOCUMENTS

| EP | 2 471 820 A1 | 7/2012 |
| JP | 2005-307055 A | 11/2005 |
| JP | 2010-121121 A | 6/2010 |
| JP | 2011-006643 A | 1/2011 |
| JP | 2011-074113 A | 4/2011 |
| JP | 2011-213754 A | 10/2011 |
| JP | 2012-021119 A | 2/2012 |
| JP | 2012-219112 A | 11/2012 |
| WO | WO-2011/043279 A1 | 4/2011 |
| WO | WO-2011/043280 A1 | 4/2011 |
| WO | WO-2013/180278 A1 | 12/2013 |

OTHER PUBLICATIONS

Takahiro (JP 2005307055 A)—Nov. 4, 2005, Machine Translated Copy.*
Seinichi et al (JP 2012219112 A), Nov. 12, 2012, Machine Translated Copy.*
International Search Report corresponding to PCT/JP2014/076787, dated Jan. 6, 2015 (5 pages).

* cited by examiner

*Primary Examiner* — Shaojia Anna Jiang
*Assistant Examiner* — Everett White
(74) *Attorney, Agent, or Firm* — Wilmer Cutler Pickering Hale and Dorr LLP

(57) ABSTRACT

A process for producing a cellulose derivative, comprising: a first step including reacting a cellulose and a first reactant comprising a long-chain reactant for reacting with a hydroxy group of the cellulose to introduce a long-chain organic group having 5 or more carbon atoms, in a solid-liquid heterogeneous system, to form a cellulose derivative in a swollen state, the cellulose derivative having the long-chain organic group having 5 or more carbon atoms introduced therein and having a part of hydroxy groups of the cellulose remained, and performing solid-liquid separation to obtain the cellulose derivative as an intermediate; and a second step including reacting the intermediate cellulose derivative and a second reactant comprising a short-chain reactant for reacting with a remaining hydroxy group of the intermediate cellulose derivative to introduce a short-chain organic group having 4 or less carbon atoms to form a final cellulose derivative having the short-chain organic group having 4 or less carbon atoms introduced therein.

12 Claims, 4 Drawing Sheets

PROCESS FOR PRODUCING CELLULOSE DERIVATIVE AND CELLULOSE DERIVATIVE

CROSS-REFERENCE TO RELATED APPLICATIONS

This application is a national stage application of International Application No. PCT/JP2014/076787 entitled "Process for Producing Cellulose Derivative and Cellulose Derivative," filed on Oct. 7, 2014, which claims priority to Japanese Patent Application No. 2013-222565, filed on Oct. 25, 2013, the disclosures of each which are hereby incorporated by reference in their entirety.

TECHNICAL FIELD

The present invention relates to a process for producing a cellulose derivative and the cellulose derivative.

BACKGROUND ART

Bioplastic using a plant as a raw material can contribute to a countermeasure against petroleum depletion and global warming and has been started being used not only in common products such as packaging, containers and fibers but also in durable products such as electronics and automobiles.

However, general bioplastics, such as polylactic acid, polyhydroxyalkanoate and modified starch, all use starch materials, more precisely, edible parts, as raw materials. Accordingly, for fear of future food shortage, it has been desired to develop a novel bioplastic using a non-edible part as a raw material.

As a raw material of a non-edible part, cellulose which is a main component of wood and plant is representative, and various types of bioplastics using the cellulose have been already developed and commercialized.

However, since a step of chemically modifying cellulose to obtain a resin is complicated and laborious and much energy is required for production, manufacturing cost of a cellulose resin is high. In addition, since durability (strength, heat resistance, water resistance, etc.) of a produced resin is not sufficient, use of the resin is limited.

Cellulose is produced as pulp by chemically separating lignin and hemicellulose from wood, etc., with the help of a chemical agent. In contrast, cotton can be used as it is since it is virtually formed of cellulose. Such a cellulose, which is a high molecular weight compound formed by polymerization of n-glucose, has a large number of hydroxy groups and thus has strong intermolecular force due to hydrogen bonds. Because of this, cellulose is hard and fragile, and has no thermoplasticity and a low solubility in a solvent except a special solvent. In addition, due to a large number of hydrophilic hydroxy groups, water absorbability is high and water resistance is low.

For improving such properties of a cellulose, various investigations have been made.

As a method for improving the properties of a cellulose, a method of substituting a hydrogen atom of a hydroxy group in a cellulose with a short-chain acyl group such as an acetyl group is known. According to this method, since the number of hydroxy groups can be reduced, the intermolecular force of a cellulose can be reduced. A further investigation has been made for producing a cellulose derivative having satisfactory thermoplasticity and water resistance by introducing a long-chain organic group having a larger number of carbon atoms in addition to a short-chain acyl group such as an acetyl group.

For example, Patent Literature 1 describes a cellulose derivative produced by substituting at least a part of hydrogen atoms of hydroxy groups of a cellulose with a short-chain acyl group (for example, an aliphatic acyl group having 2 to 4 carbon atoms) and a long-chain acyl group (for example, an aliphatic acyl group having 5 to 20 carbon atoms), and that the cellulose derivative has a low water absorption rate, satisfactory thermoplasticity, strength and fracture elongation and is suitable for molding process.

Patent Literature 2 describes a cellulose derivative having cardanol introduced therein, and that the cellulose derivative was improved in thermoplasticity, mechanical characteristics and water resistance.

Patent Literature 3 describes a cellulose derivative having cardanol and abietic acid introduced therein, and that the cellulose derivative was improved in thermoplasticity, mechanical characteristics and water resistance.

CITATION LIST

Patent Literature

Patent Literature 1: JP2010-121121A
Patent Literature 2: WO2011/043279
Patent Literature 3: WO2011/043280

SUMMARY OF INVENTION

Technical Problem

Processes for producing a cellulose resin described in the above related art have a problem in that large energy load is required for a step of recovering a product. To explain more specifically, in these production processes, the product, i.e., a cellulose derivative, is produced but dissolved in a reaction solution. Thus, the product is obtained through solid-liquid separation by adding a large amount of a poor solvent, which scarcely dissolves the product, to the reaction solution to precipitate the product. Because of this, much energy is required for recovering a solvent, a catalyst, a reactant or its derivative from a large amount of reaction solution diluted with a poor solvent.

In the meantime, a cellulose is generally esterified with acetic acid by a process using a dissolving method, in which a product is dissolved in a solvent; however, it is known that the esterification can be also performed by a process using a non-dissolving method, in which a product is not dissolved in the solvent. However, in this process, it is possible to bind an acetyl group having a small number of carbon atoms but it was difficult to bind a long-chain organic group having a large number of carbon atoms.

An object of the present invention is to provide a process for producing a cellulose derivative improved in properties at a low cost and provide the cellulose derivative improved in properties.

Solution to Problem

According to an aspect of the present invention, there is provided a process for producing a cellulose derivative, comprising:
a first step including
reacting a cellulose and a first reactant comprising a long-chain reactant for reacting with a hydroxy group of the cellulose to introduce a long-chain organic group having 5 or more carbon atoms, in a solid-liquid heterogeneous system, to form a cellulose derivative in a swollen state, the cellulose derivative having the long-chain organic group having 5 or more carbon atoms introduced therein and having a part of hydroxy groups of the cellulose remained, and performing solid-liquid separation to obtain the cellulose derivative as an intermediate; and a second step including reacting the intermediate cellulose derivative and a second reactant comprising a short-chain reactant for reacting with a remaining hydroxy group of the intermediate cellulose derivative to introduce a short-chain organic group having 4 or less carbon atoms to form a final cellulose derivative having the short-chain organic group having 4 or less carbon atoms introduced therein.

According to another aspect of the present invention, there is provided a cellulose derivative produced by the aforementioned production process.

According to another aspect of the present invention, there is provided a cellulose derivative comprising a long-chain organic group having 5 or more carbon atoms and at least one short-chain organic group having 4 or less carbon atoms introduced therein by use of hydroxy groups of a cellulose, wherein the cellulose derivative has a crystal structure derived from a cellulose derivative portion to which the short-chain organic group having 4 or less carbon atoms is linked.

According to another aspect of the present invention, there is provided a molding resin composition containing the aforementioned cellulose derivative.

Advantageous Effects of Invention

According to an exemplary embodiment of the present invention, there is provided a process for producing a cellulose derivative improved in properties at a low cost, and provided the cellulose derivative improved in properties.

DESCRIPTION OF EMBODIMENTS

Figure 1:
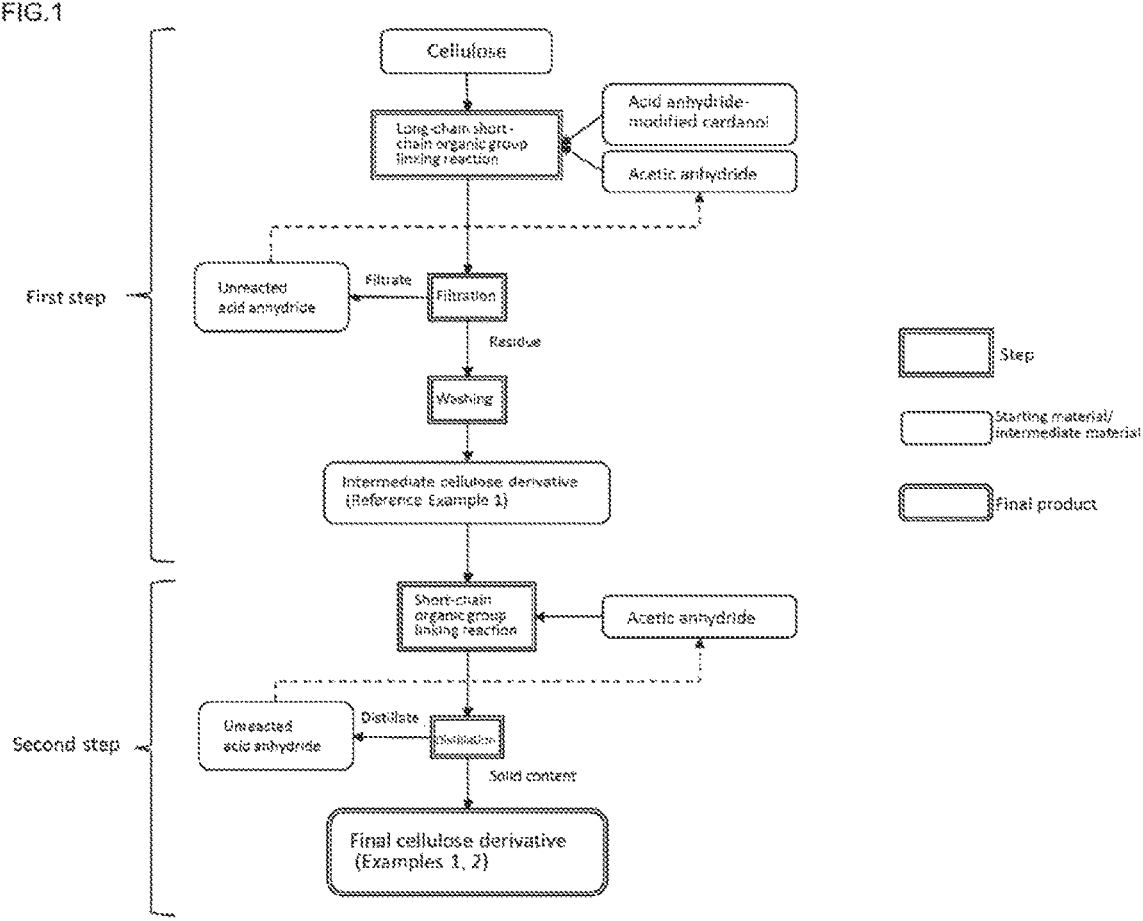
FIG. 1 is a process chart illustrating a Production Example of a cellulose derivative according to an exemplary embodiment of the present invention.

In a production process according to an exemplary embodiment of the present invention, a cellulose derivative can be obtained in the following two steps.

First, in the reaction of a first step, a cellulose and a long-chain reactant are reacted in a solid-liquid heterogeneous system and thereafter, solid-liquid separation is performed to obtain an intermediate cellulose derivative. The long-chain organic group can be introduced into the cellulose by reacting hydroxy groups of the cellulose with the long-chain reactant. At this time, hydroxy groups of the cellulose are allowed to partly remain. According to this process, since the intermediate cellulose derivative produced after completion of the reaction is not dissolved in a solution, a large amount of solvent for use in reprecipitation is not required, with the result that energy required for a recovery step of a solvent, etc., can be reduced. The solid content (cellulose intermediate) obtained after the solid-liquid separation can be, if necessary, washed and dried by a routine method.

In the following second step, hydroxy groups of the intermediate cellulose derivative and a short-chain reactant are reacted to obtain a final cellulose derivative having a short-chain organic group introduced therein. Since the number of hydrogen bonds between hydroxy groups of the cellulose reduces, the thermoplasticity and compatibility of the cellulose derivative with an additive are improved. Also in the second step, a product can be recovered without using a large amount of solvent for reprecipitation. For example, if a substance having a low boiling point, which can be separated by distillation from the final cellulose derivative, is used as a short-chain reactant or a solvent, separation between the reaction solution and a product (final cellulose derivative) can be performed by distillation without performing reprecipitation.

Now, the first step and second step will be further described below.

[First Step]

The reaction in a heterogeneous system of the first step for introducing a long-chain organic group is preferably performed in the state where the cellulose or a derivative thereof is impregnated with a first reactant including a long-chain reactant to swell a cellulose or a derivative thereof. It is preferable that a cellulose or a derivative thereof is appropriately swollen in the beginning of the reaction step; however, a cellulose or a derivative thereof may not be swollen in the beginning of the reaction step as long as a swollen state is obtained until completion of the reaction step. If an appropriate swollen state is obtained, a long-chain organic group having a larger number of carbon atoms can be easily introduced even in a solid-liquid heterogeneous system. At this time, the reaction is preferably performed in the conditions where a cellulose or a derivative thereof is hardly dissolved in a liquid phase.

The degree of swelling of a cellulose derivative having a long-chain organic group introduced therein preferably falls within the range of 10 to 300% at least at the time of completion of a reaction step (immediately before solid-liquid separation). Note that the degree of swelling can be determined in accordance with a measurement method described later. In view of reactivity, the degree of swelling is preferably 20% or more, more preferably 30% or more and particularly preferably 80% or more. In contrast, in view of the recovery rate of a product (solid content), the degree of swelling is preferably 200% or less, more preferably 150% or less and further preferably 100% or less. In order to obtain such a swollen state, it is preferable to use a solvent which provides a degree of swelling (determined by the measurement method described later) of a long-chain organic group introduced cellulose derivative within the range of 10 to 300% in introducing a long-chain organic group. In view of reactivity, it is preferable to use a solvent providing a degree of swelling of preferably 20% or more, more preferably 30% or more, particularly preferably 80% or more. In contrast, in view of the recovery rate of a product (solid content), it is preferable to use a solvent providing a degree of swelling of preferably 200% or less, more preferably 150% or less and further preferably 100% or less.

Similarly in view of the recovery rate of a product (solid content), the solubility of a cellulose derivative (intermediate cellulose derivative) having a long-chain organic group introduced therein in a reaction solution is preferably 10% by mass or less, further preferably 8% by mass or less and particularly preferably 5% by mass or less. As the solubility, for example, the solubility of the cellulose derivative produced in chloroform can be used as a standard. In this case, the solubility is preferably 10% by mass or less, further preferably 8% by mass or less and particularly preferably 5% by mass or less. The solubility herein refers to the mass ratio (percentage) of a solute (a cellulose derivative having a long-chain organic group introduced therein) dissolved in a saturated solution relative to the mass of the saturated solution at 20° C.

In the intermediate cellulose derivative obtained in the reaction of the first step, part of hydroxy groups is allowed to remain. The remaining hydroxy groups serve as crosslinking sites between molecular chains of intermediate cellulose derivatives by hydrogen bonding, with the result that dissolution of the intermediate cellulose derivative in a reaction solution is suppressed and an appropriate swollen state can be realized.

The reaction in a heterogeneous system for introducing a long-chain organic group may be performed in the presence of a solvent dissolving a first reactant and an aprotic solvent is preferably used. Furthermore, a reaction catalyst may be used, in particular, a basic catalyst is preferable. Note that if a first reactant itself is a liquid, a reaction in a solid-liquid heterogeneous system can be performed without using a solvent.

The reaction in a heterogeneous system can be performed in the presence of a short-chain reactant for introducing a short-chain organic group. The short-chain reactant is preferably a reactant which introduces an organic group having 4 or less carbon atoms (short-chain organic group), and more preferably a short-chain acylating agent, which introduces a short-chain acyl group having 2 to 4 carbon atoms. As the short-chain acylating agent, an acylating agent introducing an acetyl group or an acylating agent introducing a propionyl group is more preferable. Both acylating agents may be used together and an acylating agent introducing an acetyl group is particularly preferable. The short-chain organic group can be introduced by substituting for the hydrogen atom of a hydroxy group of a cellulose.

As the long-chain reactant, a reactant introducing an organic group having 5 or more carbon atoms (long-chain organic group) is preferable, and a long-chain acylating agent introducing a long-chain acyl group having 5 to 48 carbon atoms is more preferable. As the long-chain acylating agent, a cardanol derivative can be used and the cardanol derivative preferably has an acid anhydride group. The acid anhydride group is favorable as a functional group to be reacted with a hydroxy group of a cellulose. The long-chain organic group can be introduced by substituting for the hydrogen atom of a hydroxy group of a cellulose.

The starting cellulose to be used in the aforementioned production processes may be subjected to an activation treatment. Owing to this treatment, reactivity can be enhanced. As the activation treatment, an activation treatment routinely performed to a cellulose can be applied. After completion of the activation treatment, the liquid (protonic solvent such as acetic acid) used in the activation treatment may be substituted with a liquid (for example, an aprotic solvent) which does not inhibit the reaction between a cellulose and a reactant. If a solvent is used in the reaction in a solid-liquid heterogeneous system between a cellulose and a reactant, substitution can be made with the solvent.

[Second Step]

In the second step, the intermediate cellulose derivative obtained in the first step, more specifically, the hydroxy groups remaining in the intermediate cellulose derivative, are reacted with a short-chain reactant (second reactant) to obtain a final cellulose derivative having the short-chain organic group introduced therein. The hydroxy groups remaining in the intermediate cellulose derivative, since they form hydrogen bonds, sometimes inhibit thermoplasticity of the intermediate cellulose derivative and compatibility with an additive. In particular, a crystal region (cellulose crystal) in a cellulose, formed by hydrogen bonding of hydroxy groups, has low reactivity and likely to remain after the first step. The cellulose crystal, due to strong hydrogen bonding, has no thermoplasticity and poor compatibility with an additive. In contrast, since the amount of remaining hydroxy groups decreases by the reaction of the second step, the final cellulose derivative is improved in thermoplasticity and compatibility with an additive.

The short-chain reactant (second reactant) used in the second step is preferably a reactant introducing an organic group having 4 or less carbon atoms (short-chain organic group), similarly to the short-chain reactant used in the first step, and more preferably a short-chain acylating agent introducing a short-chain acyl group having 2 to 4 carbon atoms. A short-chain organic group can be introduced by substituting for at least a part of hydrogen atoms of the hydroxy groups remaining in the cellulose derivative. As the short-chain acylating agent, an acylating agent introducing an acetyl group or an acylating agent introducing a propionyl group is more preferable. Both acylating agents may be used together and an acylating agent introducing an acetyl group is particularly preferable since a product and a reactant can be easily separated. If a reactant having a relative low boiling point like an acylating agent introducing an acetyl group is used, a reactant can be separated from a product, for example, by distillation and thus a product can be recovered without using a large amount of poor solvent.

As described above, according to the exemplary embodiment having a first step of obtaining an intermediate cellulose derivative having a long-chain organic group introduced therein by performing a reaction in a solid-liquid heterogeneous system followed by solid-liquid separation and a second step of introducing a short-chain organic group into the intermediate cellulose derivative, it is possible to obtain a cellulose derivative different in mechanical characteristic compared to the cellulose derivative obtained by performing a reaction in a solution state and performing reprecipitation. By use of a resin composition containing such a cellulose derivative, a molded body improved in mechanical characteristics can be obtained.

The exemplary embodiment of the present invention will be further described, below.

[Cellulose]

Cellulose is a straight-chain polymer obtained by polymerizing β-D-glucose (β-D-glucopyranose) molecules represented by the following formula (1) via β (1→4) glycoside bond. Each of glucose units constituting cellulose has three hydroxy groups (where n represents a natural number). In the production process according to the exemplary embodiment of the present invention, using these hydroxy groups, the short-chain organic group and long-chain organic group can be introduced into the cellulose.

[Formula 1]

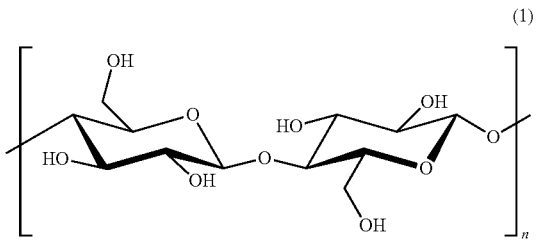

(1)

Cellulose is a main component of plants and can be obtained by a separation treatment for removing other components such as lignin from plants. Other than those thus obtained, cotton (for example, cotton linters) having a high cellulose content and pulp (for example, wood pulp) can be used directly or after they are purified. As the shape, size and form of the cellulose or a derivative thereof to be used as a raw material, a powder form cellulose or a derivative thereof having an appropriate particle size and particle shape is preferably used in view of reactivity, solid-liquid separation and handling. For example, a fibrous or powdery cellulose or a derivative thereof having a diameter of 1 to 100 μm (preferably 10 to 50 μm) and a length of 10 μm to 100 mm (preferably 100 μm to 10 mm) can be used.

The polymerization degree of cellulose in terms of degree of polymerization of glucose (average polymerization degree) preferably falls within the range of 50 to 5000, more preferably 100 to 3000 and further preferably 500 to 3000. If the polymerization degree is extremely low, the strength and heat resistance of the produced resin may not be sufficient in some cases. Conversely, if the polymerization degree is extremely high, the melt viscosity of the produced resin is extremely high, interfering with molding in some cases.

Cellulose may be mixed with chitin and chitosan having an analogous structure. When cellulose is mixed with them, the amount thereof is preferably 30% by mass or less relative to the total amount of mixture, preferably 20% by mass or less and further preferably 10% by mass or less.

The description in the above is directed to cellulose; however, the present invention is applicable to analogs of the cellulose, such as general non-edible polysaccharides, i.e., chitin, chitosan, hemicellulose, glucomannan and curdlan.

[Long-Chain Organic Group]

In the first step of a process for producing a cellulose derivative according to an exemplary embodiment of the present invention, a long-chain organic group is introduced by use of a hydroxy group of a cellulose.

The long-chain organic group can be introduced by reacting a hydroxy group of a cellulose with a long-chain reactant. The long-chain organic group corresponds to an organic group moiety introduced in place of a hydrogen atom of a hydroxy group of a cellulose. Furthermore, at the linking portion between a long-chain organic group and cellulose, for example, an ester bond, an ether bond, a urethane bond, or carbonate bond is formed.

The long-chain reactant is a compound having at least one functional group capable of reacting with a hydroxy group of a cellulose. If the linking portion is an ester bond, a compound having a carboxyl group, a carboxylic acid halide group or a carboxylic acid anhydride group can be used as the long-chain reactant. If the linking portion is an ether bond, a compound having an epoxy group or a halogen group can be used as the long-chain reactant. If the linking portion is a urethane bond, a compound having an isocyanate group can be used as the long-chain reactant. If the linking portion is a carbonate bond, a compound having a chloroformate group can be used as the long-chain reactant.

The long-chain reactant may further contain an ester bond, an ether bond, a urethane bond, a carbonate bond and an amide bond in a molecular structure other than the above functional group(s). Furthermore, the long-chain reactant may contain at least one structure selected from structures of a chain hydrocarbon, an aromatic hydrocarbon and an alicyclic hydrocarbon and may contain a structure of combination of these.

As the long-chain reactant, for example, a carboxylic acid having 5 to 24 carbon atoms and a halide or acid anhydride of the carboxylic acid can be used. The unsaturation degree and the position of an unsaturation bond of these carboxylic acids or carboxylic acid derivatives are not particularly limited. Specific examples of the carboxylic acids, for example, include pentanoic acid, caproic acid, enanthic acid, caprylic acid, pelargonic acid, capric acid, lauric acid, myristic acid, pentadecyl acid, palmitic acid, palmitoleic acid, margaric acid, stearic acid, oleic acid, vaccenic acid, linoleic acid, linolenic acid, eleostearic acid, tuberculostearic acid, arachidic acid, arachidonic acid, eicosenoic acid, behenic acid, erucic acid, lignoceric acid, hexadecadiene acid, hexadecatrienoic acid, octadecatetraenoic acid, octadecapentaenoic acid, icosatetraenoic acid, icosapentaenoic acid, docosapentaenoic acid and docosahexaenoic acid. Furthermore, as the carboxylic acid, a carboxylic acid obtained from a natural product is preferred in consideration of environment harmoniousness.

A long-chain organic group can be also formed by binding a compound low in direct reactivity to a hydroxy group of cellulose, like a hydroxy compound, to cellulose by use of a multifunctional compound. For example, the multifunctional compound and a hydroxy compound can be bound by using a hydroxy group of the hydroxy compound and a functional group of the multifunctional compound; and binding the obtained hydroxy compound derivative and a cellulose by using a hydroxy group of the cellulose and a functional group derived from the multifunctional compound. As the hydroxy compound, an alcohol and a phenol can by mentioned. As the phenol, for example, cardanol or a cardanol derivative obtained by hydrogenating an unsaturated bond of the straight-chain hydrocarbon moiety is mentioned. Furthermore, the aromatic ring of the phenol moiety of a cardanol may be hydrogenated and converted into a cyclohexane ring.

The above multifunctional compound preferably contains a hydrocarbon group. The number of carbon atoms of the hydrocarbon group is preferably 1 or more and more preferably 2 or more; and preferably 20 or less, more preferably 14 or less and further preferably 8 or less. If the number of carbon atoms is extremely large, the size of the molecule is excessively large, reducing the reactivity, with the result that it is sometimes difficult to increase a reaction rate. As such a hydrocarbon group, a divalent group is preferable. Examples thereof include divalent straight-chain aliphatic hydrocarbon groups (particularly, a straight-chain alkylene group) such as a methylene group, an ethylene group, a propylene group, a butylene group, a pentamethylene group, a hexamethylene group, a heptamethylene group, an octamethylene group, a decamethylene group, a dodecamethylene group and a hexadecamethylene group; divalent alicyclic hydrocarbon groups such as cycloheptane ring, a cyclohexane ring, a cyclooctane ring, a bicyclopentane ring, a tricyclohexane ring, a bicyclooctane ring, a bicyclononane ring and a tricyclodecane ring; divalent aromatic hydrocarbon groups such as a benzene ring, a naphthalene ring and a biphenylene group; and divalent groups obtained by combining these.

As the functional group of a multifunctional compound as mentioned above, a group selected from a carboxyl group, a carboxylic acid anhydride group, a carboxylic acid halide group (particularly, carboxylic acid chloride group), an epoxy group, an isocyanate group and a halogen group, is preferable. Of them, a carboxyl group, a carboxylic acid anhydride group, a halogen group (particularly, a chloride group) and an isocyanate group are preferable. If a cardanol or a hydrogenated cardanol is used as the hydroxy compound, as the functional group to be reacted with a phenolic hydroxy group thereof, particularly, a carboxylic acid anhydride group, a halogen group (particularly, a chloride group) and an isocyanate group are preferable. As the functional group to be reacted with a hydroxy group of cellulose, particularly a carboxylic acid anhydride group, a carboxylic acid halide group (particularly, a carboxylic acid chloride group) and an isocyanate group are preferable. The carboxylic acid anhydride group can be formed by converting a carboxyl group into an acid anhydride. The carboxylic acid halide group can be formed by converting a carboxyl group into an acid halide.

As specific examples of such a multifunctional compound, dicarboxylic acid, carboxylic acid anhydride, dicarboxylic acid halide, monochlorocarboxylic acid and diisocyanates can be mentioned. Examples of dicarboxylic acid include malonic acid, succinic acid, glutaric acid, pimelic acid, suberic acid, azelaic acid, sebacic acid, dodecane dicarboxylic acid, pentadecane dicarboxylic acid and hexadecane dicarboxylic acid. Examples of the carboxylic acid anhydride include anhydrides of dicarboxylic acids of these. Examples of the dicarboxylic halide include acid halides of these dicarboxylic acids. Examples of the monochlorocarboxylic acid include monochloro acetate, 3-chloropropionate, 3-fluoropropionic acid, 4-chlorobutyric acid, 4-fluorobutyric acid, 5-chlorovaleric acid, 5-fluorovaleric acid, 6-chlorohexanoic acid, 6-fluorohexanoic acid, 8-chlorooctanoic acid, 8-fluorooctanoic acid, 12-chlorododecanoic acid, 12-fluorododecanoic acid, 18-chlorostearic acid and 18-fluorostearic acid. Examples of the diisocyanates include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (HMDI; hydrogenated MDI). Of them, as isocyanates, 4,4'-diphenylmethane diisocyanate (MDI) and 1,6-hexamethylene diisocyanate (HDI) can be preferably used.

As the long-chain organic group, a long-chain organic group having 5 or more carbon atoms is included, and a long-chain organic group having 7 or more carbon atoms is preferable, a long-chain organic group having 8 or more carbon atoms is more preferable, a long-chain organic group having 12 or more carbon atoms is further preferable and a long-chain organic group having 16 or more carbon atoms is particularly preferable in order to obtain sufficient introduction effect of a long-chain organic group. In view of reaction efficiency at the time a long-chain organic group is introduced, a long-chain organic group having 48 or less carbon atoms is preferable, a long-chain organic group having 36 or less carbon atoms is more preferable and a long-chain organic group having 25 or less carbon atoms is particularly preferable. An obtained cellulose derivative may have a single type of long-chain organic group, or may have two or more types of long-chain organic group. If a desired cellulose derivative has both a short-chain organic group and a long-chain organic group, in order to sufficiently obtain the effect expected from introduction of a short-chain organic group and the effect expected from introduction of a long-chain organic group, the difference between the number of carbon atoms of a short-chain organic group and the number of carbon atoms of a long-chain organic group is preferably 2 or more, more preferably 3 or more and further preferably 5 or more.

The number of long-chain organic groups introduced per glucose unit of cellulose ($DS_{LO}$) (an average value), in other words, the number of hydroxy groups substituted per glucose unit of cellulose (the degree of substitution of the hydroxy groups) (an average value) can be appropriately set depending upon the structure and introduction amount of short-chain organic group and the structure of long-chain organic group, physical properties required for a desired product, and solid-liquid separation performance at the time of production. $DS_{LO}$ can be set to fall within the range of, for example, 0.1 to 2.9 and preferably 0.1 to 1.5. In order to obtain more sufficient introduction effect of a long-chain organic group, $DS_{LO}$ is preferably 0.2 or more and more preferably 0.3 or more. In view of solid-liquid separation performance at the time of production, $DS_{LO}$ is preferably 2.8 or less, more preferably 1.5 or less and further preferably 1.0 or less.

The properties of a cellulose or a derivative thereof can be improved by introducing a long-chain organic group as mentioned above into the cellulose or a derivative thereof. More specifically, water resistance and thermoplasticity can be improved.

[Short-Chain Organic Group]

In the process for producing a cellulose derivative according to an exemplary embodiment of the present invention, a short-chain organic group can be introduced using a hydroxy group of a cellulose. In the first step, a short-chain organic group may be introduced simultaneously with a long-chain organic group. In this case, the types of short-chain organic groups to be introduced in the first step and the second step may be the same or different. To simplify the process, short-chain organic groups of the same type are preferably introduced.

The short-chain organic group can be introduced by reacting a hydroxy group of a cellulose with a short-chain reactant. The short-chain organic group corresponds to an organic group moiety introduced in place of a hydrogen atom of a hydroxy group of a cellulose. The short-chain reactant is a compound having at least one functional group capable of reacting with a hydroxy group of a cellulose. Examples thereof include hydrocarbon compounds having a carboxyl group, a carboxylic acid halide group, a carboxylic acid anhydride group, an isocyanate group, a chloroformate group, an epoxy group, or a halogen group bound thereto. Specific examples thereof include an aliphatic monocarboxylic acid, and an acid halide or acid anhydride thereof; an aliphatic monoisocyanate; an aliphatic monochloroformate; aliphatic monoepoxide; and aliphatic monohalide.

As the aliphatic monocarboxylic acid, a straight or branched (having a side chain) fatty acid is mentioned. Examples of the aliphatic monoisocyanate include an aliphatic monoisocyanate having an isocyanate group bound to a straight or branched (having a side chain) aliphatic hydrocarbon. Examples of the aliphatic monochloroformate include an aliphatic monochloroformate having a chloroformate group bound to a straight or branched (having a side chain) aliphatic hydrocarbon. Examples of the aliphatic monoepoxide include an aliphatic monoepoxide having an epoxy group bound to a straight or branched (having a side chain) aliphatic hydrocarbon. Examples of the aliphatic monohalide include an aliphatic monohalides having a halogen group bound to a straight or branched (having a side chain) aliphatic hydrocarbon.

The short-chain organic group preferably has 2 to 4 carbon atoms and more preferably 2 or 3 carbon atoms. A hydrogen atom of a hydroxy group of a cellulose is preferably substituted with an acyl group having 2 to 4 carbon atoms. The acyl group is preferably an acetyl group or a propionyl group. The acyl group may include both of these. The acyl group is particularly preferably an acetyl group.

The number of short-chain organic groups introduced per glucose unit of cellulose ($DS_{SH}$) (an average value), in other words, the number of hydroxy groups substituted per glucose unit (the degree of substitution of the hydroxy groups) (an average value) can be set to fall within the range of 0.1 to 2.5, preferably 0.2 to 2.3, and more preferably 0.5 to 1.2, with respect to an intermediate cellulose derivative. Whereas, with respect to a final cellulose derivative, $DS_{SH}$ can be set to fall within the range of 0.1 to 2.9, preferably 0.5 to 2.9, more preferably 1.3 to 2.7 and further preferably 1.3 to 2.5.

In the second step, the introduction amount ($DS_{SH}$) of short-chain organic group to be introduced is preferably 0.1 or more, and more preferably 0.2 or more. If a short-chain organic group is not introduced in the first step, the introduction amount ($DS_{SH}$) of short-chain organic group to be introduced in the second step can be set to fall within the range of, for example 0.1 to 2.9, preferably 0.5 to 2.9, more preferably 1.3 to 2.7 and further preferably 1.3 to 2.5. If a short-chain organic group is introduced in the first step, the introduction amount ($DS_{SH}$) of short-chain organic group to be introduced in the second step can be set to fall within the range of, for example, 0.1 to 2.7, preferably 0.2 to 2.5 and more preferably 0.3 to 2.0.

By introducing the aforementioned short-chain organic group into a cellulose or a derivative thereof, the intermolecular force (intermolecular bond) of the cellulose can be reduced. In particular, since the number of hydroxy groups remaining after the first step is reduced by the reaction of the second step, thermoplasticity of the cellulose derivative and affinity thereof for an additive are improved.

[Crosslinking Site in Cellulose Derivative]

In a production process according to an exemplary embodiment of the present invention, a starting cellulose and a cellulose derivative after completion of the reaction preferably have a crosslinking site so as to suppress dissolution in a liquid phase (or solvent) and obtain an appropriate swollen state.

The crosslinking site refers to an intramolecular bond of cellulose (or a derivative thereof) including a chemical bond and a physical bond. Examples of the bond include a hydrogen bond between hydroxy groups of cellulose and a hydrogen bond between a hydroxy group of cellulose (or a derivative thereof) and an organic group introduced. As the crosslinking site, a crosslinking site derived from a crystal of cellulose can be used. Furthermore, the crosslinking site includes a bond due to tangling between main chains of cellulose (or derivatives thereof) and may be tangling between mutual organic groups introduced and tangling between a main chain of a cellulose (or a derivative thereof) and an organic group introduced. The crosslinking site may be an aggregation site of a part of a cellulose derivative, the site of which is formed as a result that affinity to a liquid phase (or solvent) is changed by introduction of an organic group, i.e., affinity to a liquid phase (or solvent) is locally reduced. The crosslinking site may be bond of a crosslinking agent capable of binding to a reactive functional group of cellulose and may be a bond of a crosslinking agent capable of physically binding to a cellulose molecular chain. The crosslinking agent may be an impurity derived from a plant raw material such as hemicellulose and lignin. The crosslinking site may be constituted of a combination of two or more binding sites.

It is sometimes difficult to directly measure the amount of crosslinking sites present depending on the binding structure as mentioned above; however, the amount can be indirectly measured and can be set to fall within a desired range. The amount of crosslinking site present can be indirectly determined by determining a degree of swelling of a cellulose derivative in a solvent having affinity to the cellulose derivative, for example, can be determined by a method for determining a degree of swelling (described later).

[Remaining Amount of Hydroxy Group in a Cellulose Derivative]

In view of the production process in the first step, as the amount of hydroxy group increases, the solid-liquid separation performance of the cellulose derivative tends to increase. Furthermore, in view of physical properties, as the amount of hydroxy group increases, maximum strength and heat resistance of the cellulose derivative tend to increase; whereas water absorbability tends to increase. In contrast, as the conversion rate (degree of substitution) of hydroxy groups increases, water absorbability tends to decrease, plasticity and breaking strain tend to increase; whereas, maximum strength and heat resistance tend to decrease. In consideration of these tendencies and, reaction conditions of the short-chain reactant and the long-chain reactant, the conversion rate of hydroxy groups can be appropriately set.

The number of remaining hydroxy groups per glucose unit of an intermediate cellulose derivative obtained in the first step (hydroxy group remaining degree) (average value) can be set within the range of 0.1 to 2.8. In view of the solid-liquid separation performance in the first step and introduction of a short-chain organic group in the subsequent second step, the hydroxy group remaining degree is preferably 0.2 or more, further preferably 0.8 or more and particularly preferably 1.5 or more.

The number of remaining hydroxy groups per glucose unit of a final cellulose derivative (hydroxy group remaining degree) (average value) can be set to fall within the range of 0 to 2.8. In view of e.g., maximum strength and heat resistance, hydroxy groups may remain; for example, the hydroxy group remaining degree may be 0.01 or more and further 0.1 or more. Particularly in view of flowability, the hydroxy group remaining degree of a final cellulose derivative is preferably 0.1 or more and less than 1.7, more preferably 1.2 or less and particularly preferably 0.5 or less. If the hydroxy group remaining degree is below 0.1, the ratio of a short-chain linked cellulose derivative portion relatively low in flowability tends to increase, with the result that the flowability improving effect cannot be sufficiently obtained. In contrast, if the hydroxy group remaining degree is beyond 1.7, the ratio of unreacted cellulose low in flowability increases, with the result that the flowability of the entire cellulose derivative tends to decrease.

[Production Process]

Now, a production process according to an exemplary embodiment of the present invention will be further described below.

[First Step]

[Activation of Cellulose]

Before the reaction step for introducing a long-chain organic group into cellulose, an activation treatment (pretreatment step) can be performed in order to increase the reactivity of the cellulose. As the activation treatment, an activation treatment which is routinely performed before acetylation of cellulose can be applied.

In the activation treatment employed in the production process according to an exemplary embodiment of the present invention, a cellulose is swollen by bringing the cellulose into contact with a solvent, for example, by a method of spraying an activation solvent having affinity for a cellulose to the cellulose or by a method (soaking method) of soaking a cellulose in an activation solvent. Owing to the treatment, a reactant easily penetrates between cellulose molecular chains (if a solvent and a catalyst are used, a reactant easily penetrates together with these), with the result that the reactivity of the cellulose improves. Herein, examples of the activation solvent include water; carboxylic acids such as acetic acid, propionic acid, butyric acid, valeric acid, caproic acid, enanthic acid, caprylic acid and pelargonic acid; alcohols such as methanol, ethanol, propanol and isopropanol; nitrogen-containing compounds such as dimethylformamide, formamide and ethanolamine; and sulfoxide compounds such as dimethylsulfoxide. These can be used in combination of two or more types. Particularly preferably, water, acetic acid and dimethylsulfoxide can be used.

The use amount of activation solvent relative to a cellulose (100 parts by mass) can be set to be, for example, 10 parts by mass or more, preferably 20 parts by mass or more and more preferably 30 parts by mass or more. If a cellulose is soaked in an activation solvent, the use amount of activation solvent relative to the cellulose in term of mass, can be set to be, for example, the same or more, preferably 5 times or more and more preferably 10 times or more. In view of load for removing the activation solvent after the pretreatment and cost reduction of materials, the use amount of activation solvent is preferably 300 times or less, more preferably 100 times or less and further preferably 50 times or less.

The temperature of the activation treatment can be appropriately set within the range of, for example, 0 to 100° C. In view of the efficiency of activation and reduction of energy cost, the temperature is preferably 10 to 40° C. and more preferably 15 to 35° C.

The time for the activation treatment can be appropriately set within the range of, for example, 0.1 hour to 72 hours. In order to perform sufficient activation and reduce the treatment time, the time is preferably 0.1 hour to 24 hours and more preferably 0.5 hours to 3 hours.

After the activation treatment, an excessive activation solvent can be removed by a solid-liquid separation method such as suction filtration.

If a solvent is used in a reaction for introducing an organic group, the activation solvent contained in a cellulose can be substituted with the solvent to be used in the reaction after the activation treatment. For example, a substitution treatment can be performed in accordance with the soaking method for an activation treatment mentioned above by changing the activation solvent to the solvent to be used in the reaction.

[Reaction of the First Step] Introduction of Long-Chain Organic Group (or Long-Chain Organic Group and Short-Chain Organic Group)

To a cellulose or a cellulose to which the above activation treatment was applied, a long-chain organic group (or a long-chain organic group and a short-chain organic group) is introduced. Note that, a method of introducing a short-chain organic group and a long-chain organic group by use of a short-chain reactant and a long-chain reactant will be described; however, a cellulose derivative having a long-chain organic group alone introduced therein can be produced in the same manner as above except that a short-chain reactant is not used.

In the reaction step, a short-chain reactant and a long-chain reactant as mentioned above, if necessary, a solvent and a catalyst are mixed with a cellulose. The cellulose, the short-chain reactant and the long-chain reactant can be reacted in a solid-liquid heterogeneous system. At this time, if necessary, heating or stirring can be performed. The types of the reactive functional groups of the short-chain reactant and long-chain reactant are preferably the same. Note that, if the above reactants are acid anhydrides, a mixed acid anhydride of a long-chain organic acid and a short-chain organic acid (asymmetric acid anhydride) can be used. The mixed acid anhydride serves as a long-chain reactant as well as a short-chain reactant.

In the reaction step, a cellulose is soaked in a reaction solution containing the short-chain reactant and the long-chain reactant to swell the cellulose. The cellulose in this state can be reacted. Owing to this, the short-chain reactant and the long-chain reactant can easily penetrate between cellulose molecular chains, with the result that the reactivity improves.

The use amount of reaction solvent relative to the cellulose in terms of mass can be set to be, for example, the same or more, preferably five times or more, and more preferably 10 times or more. In view of e.g., load for removing a reaction solution after completion of a reaction and cost reduction of materials, the use amount of the reaction solvent is preferably 300 times or less, more preferably 100 times or less, further preferably 50 times or less and particularly preferably 30 times or less.

The reaction temperature is preferably 10° C. or more, more preferably 20° C. or more and further preferably 30° C. or more in view of reaction efficiency etc. In view of e.g., suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more in order to sufficiently conduct a reaction, and preferably 24 hours or less and more preferably 12 hours or less in view of e.g., efficiency of the production process.

If a solvent is used, a solvent having high affinity for a long-chain and short-chain linked cellulose derivative (or long-chain linked cellulose derivative) i.e., an intermediate product, is preferably used. A solvent capable of dissolving a general short-chain linked cellulose derivative having no crosslinking site or a solvent capable of dissolving a general long-chain and short-chain linked cellulose derivative having no crosslinking site can be used. As such a solvent, which can be appropriately selected depending upon the amount of remaining hydroxy groups in a cellulose derivative and the hydrophobicity and introduction amount of the short-chain organic group and long-chain organic group, an aprotic solvent is preferable, and particularly, a proton-affinity solvent capable of forming a hydrogen bond with a hydroxy group of cellulose is preferable.

Examples of such a high affinity solvent include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (dioxane, tetrahydrofuran, dioxolane, etc.) and heteroarene (pyridine, quinoline, etc.). Examples of ether having high affinity include, other than the above cyclic ethers, non-cyclic ethers having a plurality of ether structures such as 1,2-dimethoxyethane and diethylene glycol dimethyl ether and ethers having an aryl group such as methylphenyl ether and diphenyl ether. Examples of the amides include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents may be used as a mixture of two or more. Owing to use of such a solvent as mentioned above, a satisfactory swollen state of a cellulose derivative is formed and the effect of steric hindrance is reduced and the reactivity of a reactant can be increased.

In the course of a reaction, the same or different type of solvent may be appropriately added.

Note that, the "general long-chain and short-chain linked cellulose derivative (or short-chain linked cellulose derivative) having no crosslinking site" corresponds to a long-chain and short-chain linked cellulose derivative (or short-chain linked cellulose derivative) obtained by performing a reaction using a solvent capable of dissolving a product, adding a poor solvent to the reaction solution dissolving the product to precipitate the product and performing solid-liquid separation.

If a catalyst is used, the catalyst can be appropriately selected depending upon the type of short-chain reactant or long-chain reactant and then put in use. If the reactant is, for example, a carboxylic acid and a carboxylic acid anhydride, an acid catalyst, a base catalyst and a metal-based catalyst can be used. Examples of the acid catalyst include inorganic acids (sulfuric acid, perchloric acid, hydrochloric acid, etc.) and organic acids (methane sulfonic acid, toluene sulfonic acid, etc.). Examples of the base catalyst include pyridine derivatives (dimethylaminopyridine (DMAP), 4-pyrrolidinopyridine, etc.), imidazoles (1-methylimidazole, 1,2-dimethylimidazole, etc.) and amidines (diazabicyclo undecene (DBU), diazabicyclononene, etc.). In view of reactivity, DMAP and DBU are preferable, and particularly DMAP is preferable. Examples of the metal-based catalyst include metal chlorides (iron chloride, aluminum chloride, indium chloride, basic zirconium chloride, zinc chloride, cobalt chloride, nickel chloride, copper chloride, etc.), metal nitrates (compounds obtained by substituting chloride ions of the aforementioned metal chlorides with nitric acid ions, etc.), metal sulfates (compounds obtained by substituting chloride ions of the aforementioned metal chlorides with sulfuric acid ions, etc.) and metal acetic acid salts (compounds obtained by substituting chloride ions of the aforementioned metal chlorides with acetic acid ions, etc.).

If a proton-affinity solvent is used as a solvent, a base catalyst is preferable.

If the reactant is an isocyanate, an organic metal catalyst and a base catalyst can be used. Examples of the organic metal catalyst include tin octylate and dibutyltin dilaurate. Examples of the base catalyst include triethylene diamine and trimethyl aminoethyl piperazine.

[Recovery of Product (Solid-Liquid Separation)]

The product in the first step, i.e., a long-chain and short-chain linked cellulose derivative (or long-chain linked cellulose derivative), since it at least has crosslinking sites consisting of remaining hydroxy groups, tends to have low solubility to a reaction solution. Thus, the product can be easily recovered by a general solid-liquid separation treatment. Examples of the solid-liquid separation treatment include filtration (natural filtration, filtration under reduced pressure, pressure filtration, centrifugal filtration and hot filtration of these), spontaneous precipitation/levitation, liquid separation, centrifugation and compression. These may be used in an appropriate combination. In a production process of the first step according to the exemplary embodiment, a step of precipitating and recovering a product dissolved in a reaction solution with a large amount of poor solvent can be omitted. Thus, the production process has low energy load in the recovery step, compared to a production process of the related art requiring such precipitation and recovery.

The solid content obtained by the solid-liquid separation may be, if necessary, washed and dried by a general method.

[Second Step]

[Reaction of Second Step] Introduction of Short-Chain Organic Group

In the second step, the intermediate cellulose derivative obtained in the first step, more specifically, hydroxy groups remaining in the intermediate cellulose derivative, are reacted with a short-chain reactant (second reactant) to obtain a final cellulose derivative.

In the reaction step, a short-chain reactant as mentioned above, and, if necessary, a solvent and a catalyst are mixed with the intermediate cellulose derivative, and the short-chain reactant can be reacted with the intermediate cellulose derivative. At this time, if necessary, heating and stirring can be made.

The use amount of reaction solvent relative to the intermediate cellulose derivative in terms of mass can be set to be, for example, the same or more, preferably twice or more. In view of e.g., load for removing the reaction solution after completion of the reaction and cost reduction of materials, the use amount is more preferably 100 times or less and further preferably 50 times or less and particularly preferably 20 times or less. Note that, in the second step, since a short-chain reactant having a relatively low degree of steric hindrance is reacted, the degree of swelling of a cellulose derivative in a reaction solution and the solubility thereof can be reduced compared to those in the first step in which a long-chain reactant having a high degree of steric hindrance is reacted. Thus, in the second step, the use amount of reaction solution can be reduced compared to that of the first step.

The reaction temperature is preferably 10° C. or more, more preferably 20° C. or more and further preferably 30° C. or more in view of reaction efficiency etc. In view of e.g., suppression of decomposition reaction and reduction in energy cost, the reaction temperature is preferably 200° C. or less, more preferably 150° C. or less and further preferably 100° C. or less.

The reaction time is preferably 0.5 hours or more and more preferably one hour or more in order to sufficiently conduct a reaction, and preferably 24 hours or less in view of e.g., efficiency of the production process.

If a solvent is used, a solvent having high affinity for a final product, i.e., a long-chain and short-chain linked cellulose derivative, is preferably used, and a solvent capable of dissolving a general short-chain linked cellulose derivative having no crosslinking site or a solvent capable of dissolving a general long-chain and short-chain linked cellulose derivative having no crosslinking site can be used. As a solvent, which can be appropriately selected depending upon the amount of remaining hydroxy groups in a cellulose derivative and the hydrophobicity and introduction amount of short-chain organic group and long-chain organic group, an aprotic solvent is preferable, and particularly, a proton-affinity solvent capable of forming a hydrogen bond with a hydroxy group of cellulose is preferable. As described later, in view of a recovery process for recovering the product of the second step by distillation, a solvent having a low boiling point is preferably used.

Examples of such a high affinity solvent include a hetero cyclic compound, an ether, an amide, a ketone, an ester, a polar halogenated hydrocarbon, a carbonate, a nitro compound, a nitrile and an organosulfur compound. Examples of the hetero cyclic compound include cyclic ethers (dioxane, tetrahydrofuran, dioxolane, etc.) and heteroarene (pyridine, quinoline, etc.). Examples of ether having high affinity include, other than the above cyclic ethers, non-cyclic ethers having a plurality of ether structures such as 1,2-dimethoxy-ethane and diethylene glycol dimethyl ether and ethers having an aryl group such as methylphenyl ether and diphenyl ether. Examples of the amides include N-methylpyrrolidone, N,N-dimethylformamide and N,N-dimethylacetamide. Examples of the ketone include acetone, methyl ethyl ketone, methyl isobutyl ketone and cyclohexanone. Examples of the ester include methyl formate, methyl acetate, ethyl acetate, butyl acetate and methyl cellosolve acetate. Examples of the polar halogenated hydrocarbon include chloroform, methylene chloride, dichloroethane, propylene chloride and tetrachloroethane. Examples of the carbonate include propylene carbonate and butylene carbonate. Examples of the nitro compound include nitromethane and nitropropane. Examples of the nitrile include acetonitrile and benzonitrile. Examples of the organosulfur compound include sulfoxide compounds such as dimethylsulfoxide. These solvents may be used as a mixture two or more. Owing to use of such a solvent as mentioned above, a satisfactory swollen state or dissolved state of a cellulose derivative is formed and the effect of steric hindrance is reduced and the reactivity of a reactant can be increased.

In the middle of a reaction, the same or different type of solvent may be appropriately added.

Note that, the "general long-chain and short-chain linked cellulose derivative having no crosslinking site (or short-chain linked cellulose derivative)" corresponds to a long-chain and short-chain linked cellulose derivative (or short-chain linked cellulose derivative) obtained by performing a reaction using a solvent capable of dissolving a product, adding a poor solvent to the reaction solution dissolving the product to precipitate the product, and performing solid-liquid separation.

If a catalyst is used, the catalyst can be appropriately selected depending upon the type of short-chain reactant and then put in use. If the reactant is, for example, a carboxylic acid and a carboxylic acid anhydride, an acid catalyst, a base catalyst and a metal-based catalyst can be used. Examples of the acid catalyst include inorganic acids (sulfuric acid, perchloric acid, hydrochloric acid, etc.) and organic acids (methane sulfonic acid, toluene sulfonic acid, etc.). Examples of the base catalyst include pyridine derivatives (dimethylaminopyridine (DMAP), 4-pyrrolidinopyridine, etc.), imidazoles (1-methylimidazole, 1,2-dimethylimidazole, etc.) and amidines (diazabicyclo undecene (DBU), diazabicyclononene, etc.). In view of reactivity, DMAP and DBU are preferable, and particularly DMAP is preferable. Examples of the metal-based catalyst include metal chlorides (iron chloride, aluminum chloride, indium chloride, basic zirconium chloride, zinc chloride, cobalt chloride, nickel chloride, copper chloride, etc.), metal nitrates (compounds obtained by substituting chloride ions of the aforementioned metal chlorides with nitric acid ions, etc.), metal sulfates (compounds obtained by substituting chloride ions of the aforementioned metal chlorides with sulfuric acid ions, etc.) and metal acetic acid salts (compounds obtained by substituting chloride ions of the aforementioned metal chlorides with acetic acid ions, etc.).

If a proton-affinity solvent is used, a base catalyst is preferable.

If the reactant is isocyanate, an organic metal catalyst and a base catalyst can be used. Examples of the organic metal catalyst include tin octylate and dibutyltin dilaurate. Examples of the base catalyst include triethylenediamine and trimethyl aminoethyl piperazine.

[Recovery of Product]

The final cellulose derivative to be obtained in the second step can be recovered from the reaction solution in accordance with a general recovery method, which is not particularly limited. If a cellulose derivative is not dissolved in the reaction solution, a method in which a solid-liquid separation is conducted to separate the product from the reaction solution is preferable in view of production energy; whereas if a cellulose derivative is dissolved or mixed in the reaction solution and thus it is difficult to perform solid-liquid separation, a method in which the reaction solution is distilled to recover the remaining cellulose derivative is preferable.

In the distillation of the reaction solution, a short-chain reactant and a reaction solvent preferably have a low boiling point. In particular, as the reactant, a reactant which introduces an acetyl group is preferable. Furthermore, when a reaction solution is distilled, a catalyst is preferably not used. When a catalyst is used, a catalyst having a low boiling point is preferable; however, a catalyst may not be removed by distillation but removed from a product with e.g., a cleaning solvent. Moreover, when a reaction solution is distilled, distillation may be terminated at the time when a cellulose derivative precipitates, and then the remaining reaction solution and the cellulose derivative can be separated by solid-liquid separation to recover the cellulose derivative.

[Dissociation of Crosslinking Site]

After an organic group is introduced, the crosslinking site of a cellulose derivative, if necessary, can be dissociated. Reducing the number of hydrogen bonds by substitution of hydroxy groups in the second step is one of dissociation methods. Additional dissociation can be separately performed. If additional dissociation is performed, further, thermoplasticity of a cellulose derivative and compatibility thereof with an additive can be improved.

As a method of dissociating crosslinking sites including the method to be used in the second step, heating, addition of a plasticizer, addition of a solvent, addition of a reactive organic substance or an inorganic substance for reacting with the linking sites and dissociating the sites, irradiation with an electromagnetic wave such as a UV ray, an electron beam and a neutron beam, are mentioned. Heating or addition of a plasticizer may be performed at the time of melting and kneading a product. As the plasticizer, various types of additives described later can be used. If crosslinking is due to a hydrogen bond formed with hydroxy groups in a cellulose derivative, a method of dissociating a hydrogen bond is effective; for example, a substance capable of dissociating a hydrogen bond can be added. As the substance capable of dissociating a hydrogen bond, for example, a substance reacting with a hydroxy group to eliminate the hydroxy group (for example, substituting the hydrogen atom of a hydroxy group or converting the hydroxy group to another functional group) is mentioned. Alternatively, a plasticizer and an ion liquid are mentioned. As the substance to be reacted with a hydroxy group, a short-chain reactant and long-chain reactant as mentioned above can be used.

[Physical Properties of Product (Organic Group-Introduced Cellulose Derivative)]

The cellulose derivative obtained by a production process according to an exemplary embodiment of the present invention is reduced in intermolecular force (crosslinking sites) compared to a cellulose since an organic group (a short-chain organic group and long-chain organic group) is introduced by use of a hydroxy group of a cellulose. In addition, since the long-chain organic group introduced serves as an internal plasticizer, such an organic group-introduced cellulose derivative can exhibit satisfactory thermoplasticity. If a long-chain organic group having high hydrophobicity is used, water resistance can be further enhanced.

Such an organic group introduced cellulose derivative can possess a crystal structure derived from a short-chain linked cellulose derivative portion. The intermediate cellulose derivative obtained in the first step has remaining hydroxy groups, which tend to remain in a low-reactive cellulose crystal. However, if the remaining hydroxy groups are substituted with short-chain organic groups in the second step, the amount of cellulose crystal reduces and a crystal of a short-chain linked cellulose derivative portion can be newly produced. As the short-chain linked cellulose derivative portion, for example, portions of a cellulose acetate structure, a cellulose propionate structure and a cellulose butyrate structure can be mentioned. In particular, if the amount of short-chain organic group linked increases, all hydroxy groups in a glucose unit are substituted with short-chain organic groups, with the result that a cellulose triacetate structure, a cellulose tripropionate structure and a cellulose tributyrate structure tend to be produced. If the crystal of the short-chain linked cellulose derivative portion has polymorphisms, all of the polymorphisms are possibly present. For example, in the case of a cellulose triacetate (CTA) portion, both of polymorphisms called as CTA-I and CTA-II are possibly present.

The crystal of a short-chain linked cellulose derivative portion can be evaluated, for example, by X-ray diffraction. At the time of evaluation, if a cellulose derivative is, for example, pressed to increase the density, confirmation of signals can be made easier.

[Molding Resin Composition and Additive]

The organic group-introduced cellulose derivative according to an exemplary embodiment of the present invention can provide a resin composition suitable as a molding material by adding additives in accordance with desired properties. In particular, since the remaining hydroxy groups are substituted with short-chain organic groups in the second step, the final cellulose derivative obtained in the exemplary embodiment has a high compatibility with an additive compared to the intermediate cellulose derivative obtained in the first step. The final cellulose derivative can be compatible with an additive which is compatible with a general cellulose derivative.

To the cellulose derivative according to an exemplary embodiment of the present invention, various types of additives usually used in thermoplastic resins can be applied. For example, if a plasticizer is added, thermoplasticity and breaking elongation can be more improved. Examples of such a plasticizer include phthalic esters such as dibutyl phthalate, diaryl phthalate, diethyl phthalate, dimethyl phthalate, di-2-methoxyethyl phthalate, ethyl phthalyl ethyl glycolate and methyl phthalyl ethyl glycolate; tartaric acid esters such as dibutyl tartrate; adipic acid esters such as dioctyl adipate and diisononyl adipate; polyhydric alcohol esters such as triacetin, diacetyl glycerin, tripropionitrile glycerin and glyceryl monostearate; phosphoric acid esters such as triethyl phosphate, triphenyl phosphate and tricresyl phosphate; dibasic fatty acid esters such as dibutyl adipate, dioctyl adipate, dibutyl azelate, dioctyl azelate and dioctyl sebacate; citric acid esters such as triethyl citrate, acetyltriethyl citrate and tributyl acetylcitrate; epoxylated vegetable oils such as epoxylated soybean oil and epoxylated linseed oil; castor oil and a derivative thereof; benzoic acid esters such as ethyl O-benzoyl benzoate; aliphatic dicarboxylic acid esters such as sebacate and azelate; unsaturated dicarboxylic acid esters such as maleate; and N-ethyl toluene sulfonamide, triacetin, O-cresyl p-toluenesulfonate and tripropionin. Particularly of them, if a plasticizer such as dioctyl adipate, benzyl adipate-2 butoxyethoxyethyl, tricresyl phosphate, diphenylcresyl phosphate or diphenyl octyl phosphate is added, not only thermoplasticity and breaking elongation but also shock resistance can be effectively improved.

Examples of other plasticizers include cyclohexane dicarboxylic acid esters such as dihexyl cyclohexanedicarboxylate, dioctyl cyclohexanedicarboxylate and di-2-methyloctyl cyclohexanedicarboxylate; trimellitic acid esters such as dihexyl trimellitate, diethylhexyl trimellitate and dioctyl trimellitate; and pyromellitic acid esters such as dihexyl pyromellitate, diethylhexyl pyromellitate and dioctyl pyromellitate.

To the cellulose derivative according to an exemplary embodiment of the present invention, if necessary, an inorganic or organic granular or fibrous filler can be added. By adding a filler, strength and rigidity can be more improved. Examples of the filler include, mineral particles (talc, mica, baked siliceous earth, kaolin, sericite, bentonite, smectite, clay, silica, quartz powder, glass beads, glass powder, glass flake, milled fiber, Wollastonite, etc.), boron-containing compounds (boron nitride, boron carbonate, titanium boride etc.), metal carbonates (magnesium carbonate, heavy calcium carbonate, light calcium carbonate, etc.), metal silicates (calcium silicate, aluminum silicate, magnesium silicate, magnesium aluminosilicate, etc.), metal oxides (magnesium oxide etc.), metal hydroxides (aluminum hydroxide, calcium hydroxide, magnesium hydroxide, etc.), metal sulfates (calcium sulfate, barium sulfate, etc.), metal carbides (silicon carbide, aluminum carbide, titanium carbide, etc.), metal nitrides (aluminum nitride, silicon nitride, titanium nitride, etc.), white carbon and metal foils.

Examples of the fibrous filler include organic fibers (natural fiber, papers etc.), inorganic fibers (glass fiber, asbestos fiber, carbon fiber, silica fiber, silica alumina fiber, Wollastonite, zirconia fiber, potassium titanate fiber etc.) and metal fibers. These fillers can be used singly or in combination of two or more types.

To the cellulose derivative according to an exemplary embodiment of the present invention, if necessary, a flame retardant can be added. By adding a flame retardant, flame resistance can be imparted. Examples of the flame retardant include metal hydrates such as magnesium hydroxide, aluminum hydroxide and hydrotalcite, basic magnesium carbonate, calcium carbonate, silica, alumina, talc, clay, zeolite, bromine-based flame retardant, antimony trioxide, phosphoric acid based flame retardant (aromatic phosphate, aromatic condensed phosphate, etc.), compounds containing phosphorus and nitrogen (phosphazene compound), etc. These flame retardants can be used singly or in combination with two or more types.

To the cellulose derivative according to an exemplary embodiment of the present invention, if necessary, a shock resistance improver can be added. By adding a shock resistance improver, shock resistance can be improved. Examples of the shock resistance improver include a rubber component and a silicone compound. Examples of the rubber component include a natural rubber, epoxylated natural rubber and synthesized rubber. Furthermore, examples of the silicone compound include organic polysiloxane formed by polymerization of alkyl siloxane, alkyl phenyl siloxane, etc. and modified silicone compounds obtained by modifying a side chain or an end of an organic polysiloxane as mentioned above with polyether, methylstyryl, alkyl, higher fatty acid ester, alkoxy, fluorine, an amino group, an epoxy group, a carboxyl group, a carbinol group, a methacryl group, a mercapto group, a phenol group etc. These shock resistance improvers can be used singly or in combination of two or more types.

As the silicone compound, a modified silicone compound (modified polysiloxane compound) is preferred. As the modified silicone compound, a modified polydimethyl siloxane is preferred, which has a structure having a main chain constituted of dimethyl siloxane repeat units and a side chain or a terminal methyl group partly substituted with an organic substituent containing at least one group selected from an amino group, an epoxy group, a carbinol group, a phenol group, a mercapto group, a carboxyl group, a methacryl group, a long-chain alkyl group, an aralkyl group, a phenyl group, a phenoxy group, an alkyl phenoxy group, a long-chain fatty acid ester group, a long-chain fatty acid amide group and a polyether group. The modified silicone compound, because of the presence of such an organic substituent, is improved in affinity for the aforementioned cellulose derivative and dispersibility in the cellulose derivative is improved. Consequently, a resin composition excellent in shock resistance can be obtained.

As such a modified silicone compound, a modified silicone compound produced in accordance with a conventional method can be used.

Examples of the organic substituent contained in the modified silicone compound include the organic substituents represented by the following formulas (2) to (20) are mentioned:

[Formula 2]

(2)

(3)

[Formula 3]

(4)

(5)

(6)

[Formula 4]

—R$^7$—OH (7)

(8)

(9)

—R$^{13}$—SH (10)

[Formula 5]

—R$^{14}$COOH (11)

[Formula 6]

(12)

[Formula 7]

—R$^{16}$ (13)

[Formula 8]

(14)

(15)

(16)

(17)

-continued

[Formula 9]

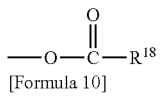
(18)

[Formula 10]

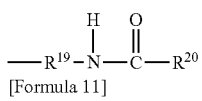
(19)

[Formula 11]

(20)

where a and b each represent an integer of 1 to 50.

In the aforementioned formulas, $R^1$ to $R^{10}$, $R^{12}$ to $R^{15}$, $R^{19}$ and $R^{21}$ each represent a divalent organic group. Examples of the divalent organic group include alkylene groups such as a methylene group, an ethylene group, a propylene group and a butylene group; alkyl arylene groups such as a phenylene group and a tolylene group; oxyalkylene groups and polyoxyalkylene groups such as —(CH$_2$—CH$_2$—O)c- (c represents an integer from 1 to 50), —[CH$_2$—CH(CH$_3$)—O]$_d$— (d represents an integer from 1 to 50), and —(CH$_2$)e-NHCO— (e represents an integer from 1 to 8). Of these, an alkylene group is preferable and particularly, an ethylene group and a propylene group are preferable.

In the aforementioned formulas, $R^{11}$, $R^{16}$ to $R^{18}$, $R^{20}$ and $R^{22}$ each represent an alkyl group having at most 20 carbon atoms. Examples of the alkyl group include a methyl group, an ethyl group, a propyl group, a butyl group, a pentyl group, a hexyl group, a heptyl group, an octyl group, a nonyl group, a decyl group, an undecyl group, a dodecyl group, a tridecyl group, a tetradecyl group and a pentadecyl group. Furthermore, the structures of the above alkyl groups may have one or more unsaturated bonds.

The total average content of organic substituents in a modified silicone compound desirably falls within the range where the modified silicone compound having an appropriate particle diameter (for example, 0.1 μm or more and 100 μm or less) can be dispersed in a matrix, i.e., a cellulose derivative, during a process for producing a cellulose derivative composition. If a modified silicone compound having an appropriate particle diameter is dispersed in a cellulose derivative, stress concentration on the periphery of a silicone region having a low elastic modulus effectively occurs. As a result, a resin molded body having excellent shock resistance can be obtained. The total average content of such organic substituents is preferably 0.01% by mass or more and more preferably 0.1% by mass or more, and also preferably 70% by mass or less and more preferably 50% by mass or less. If an organic substituent is contained appropriately, the modified silicone compound can be improved in affinity for a cellulose resin, the modified silicone compound having an appropriate particle diameter can be dispersed in a cellulose derivative, and further bleed out due to separation of the modified silicone compound in a molding can be suppressed. If the total average content of the organic substituents is excessively low, it becomes difficult to disperse a modified silicone compound having an appropriate particle diameter in a cardanol-added cellulose resin.

If an organic substituent of the modified polydimethyl siloxane compound is an amino group, an epoxy group, a carbinol group, a phenol group, a mercapto group, a carboxyl group or a methacryl group, the average content of the organic substituent in the modified polydimethyl siloxane compound can be obtained by the following Expression (I).

Organic substituent average content (%)=(organic substituent formula-weight/organic substituent equivalent)×100  (I)

In the Expression (I), the organic substituent equivalent is an average mass of a modified silicone compound per organic substituent (1 mole).

When the organic substituent of the modified polydimethyl siloxane compound is a phenoxy group, an alkylphenoxy group, a long-chain alkyl group, an aralkyl group, a long-chain fatty acid ester group or a long-chain fatty acid amide group, the average content of the organic substituent of the modified polydimethyl siloxane compound can be obtained from the following Expression (II).

Organic substituent average content (%)=x×w/ [(1−x)×74+x×(59+w)]×100  (II)

In the Expression (II), x is an average molar fraction of the organic substituent-containing a siloxane repeat unit relative to all siloxane repeat units of the modified polydimethyl siloxane compound; and w is the formula weight of the organic substituent.

In the case where the organic substituent of the modified polydimethyl siloxane compound is a phenyl group, the average content of the phenyl group in the modified polydimethyl siloxane compound can be obtained by the following Expression (III).

Phenyl group average content (%)=154×x/[74× (1−x)+198×x]×100  (III)

In the Expression (III), x is an average molar fraction of the phenyl group-containing siloxane repeat unit relative to all siloxane repeat units in the modified polydimethyl siloxane compound (A).

In the case where the organic substituent of the modified polydimethyl siloxane compound is a polyether group, the average content of the polyether group in the modified polydimethyl siloxane compound can be obtained by the following Expression (IV).

Polyether group average content (%)=HLB value/ 20×100  (IV)

In the Expression (IV), the HLB value represents the degree of affinity of a surfactant for water and oil, and is defined by the following Expression (V) based on the Griffin Act.

HLB value=20×(sum of formula weights of hydrophilic moieties/molecular weight)  (V)

To the cellulose derivative of the exemplary embodiment, two or more modified silicone compounds having different affinities to the derivative may be added. In this case, dispersibility of a relative low-affinity modified silicone compound (A1) is improved by a relative high-affinity modified silicone compound (A2) to obtain a cellulose resin composition having even more excellent shock resistance. The total average content of an organic substituent of the relatively low-affinity modified silicone compound (A1) is preferably 0.01% by mass or more and more preferably 0.1% by mass or more and also preferably 15% by mass or less and more preferably 10% by mass or less. The total average content of an organic substituent of the relatively high-affinity modified silicone compound (A2) is preferably 15% by mass or more and more preferably 20% by mass or more and also preferably 90% by mass or less.

The blending ratio (mass ratio) of the modified silicone compound (A1) to the modified silicone compound (A2) can be set to fall within the range of 10/90 to 90/10.

In a modified silicone compound, dimethyl siloxane repeat units and organic substituent-containing siloxane repeat units each of which may be homologously and continuously connected, alternately connected or connected at random. A modified silicone compound may have a branched structure.

The number average molecular weight of a modified silicone compound is preferably 900 or more and more preferably 1000 or more, and also preferably 1000000 or less, more preferably 300000 or less and further preferably 100000 or less. If the molecular weight of a modified silicone compound is sufficiently large, loss by vaporization can be suppressed in kneading with a melted cellulose derivative during a process for producing a cellulose derivative composition. Furthermore, if the molecular weight of a modified silicone compound is appropriate (not excessively large), a uniform molding having good dispersibility can be obtained.

As the number average molecular weight, a value (calibrated by a polystyrene standard sample) obtained by measuring a 0.1% chloroform solution of a sample by GPC can be employed.

The addition amount of such a modified silicone compound is preferably, in view of obtaining sufficient addition effect, 1% by mass or more relative to the total cellulose derivative composition and more preferably 2% by mass or more. In view of sufficiently ensuring properties of a cellulose resin such as strength and suppressing bleed out, the addition amount of a modified silicone compound is preferably 20% by mass or less and more preferably 10% by mass or less.

By adding such a modified silicone compound to a cellulose derivative, the modified silicone compound having an appropriate particle diameter (for example, 0.1 to 100 μm) can be dispersed in the resin and the shock resistance of a resin composition can be improved.

To the cellulose derivative of the exemplary embodiment, if necessary, additives such as a colorant, an antioxidant and a heat stabilizer may be added as long as they are applied to conventional resin compositions.

To the cellulose derivative of the exemplary embodiment, if necessary, a general thermoplastic resin may be added.

As the thermoplastic resin, a polyester can be added and a straight-chain aliphatic polyester can be preferably used. As the straight-chain aliphatic polyester (Y), the following straight-chain aliphatic polyesters (Y1) and (Y2) are preferable, for example, polybutylene succinate, polybutylene succinate adipate and polycaprolactone can be mentioned.

(Y1) Straight-chain aliphatic polyester containing at least one of repeating units represented by the following formula (VI) and formula (VII)

—(CO—R²³—COO—R²⁴—O—)—  (VI)

—(CO—R²⁵—O—)—  (VII)

In the formula (VI), $R^{23}$ represents a divalent aliphatic group having carbon atoms of 1 to 12, preferably 2 to 8 and more preferably 2 to 4; and $R^{24}$ represents a divalent aliphatic group having carbon atoms of 2 to 12, preferably 2 to 8 and more preferably 2 to 4.

In the formula (VII), $R^{25}$ represents a divalent aliphatic group having carbon atoms of 2 to 10, preferably 2 to 8 and more preferably 2 to 4.

(Y2) Straight-chain aliphatic polyester composed of a product obtained by ring-opening polymerization of a cyclic ester.

The straight-chain aliphatic polyester (Y1) can be obtained by a condensation reaction between at least one selected from the group consisting of, for example, an aliphatic dicarboxylic acid, an acid anhydride thereof and a diester thereof, and an aliphatic diol.

The aliphatic dicarboxylic acid has carbon atoms of, for example, 3 to 12, preferably 3 to 9, more preferably 3 to 5. The aliphatic carboxylic acid is, for example, an alkane dicarboxylic acid. Specific examples thereof include malonic acid, succinic acid, adipic acid, sebacic acid, azelaic acid and dodecane dicarboxylic acid. The aliphatic dicarboxylic acids, for example, may be used alone or in combination of two or more.

The aliphatic diol has carbon atoms of, for example, 2 to 12, preferably 2 to 8 and more preferably 2 to 6. The aliphatic diol is, for example, an alkylene glycol. Specific examples thereof include ethylene glycol, 1,3-propylene glycol, 1,4-butane diol, 1,6-hexane diol, 1,9-nonane diol, 1,10-decane diol and 1,12-dodecane diol. Of them, a straight-chain aliphatic diol having 2 to 6 carbon atoms is preferable, and particularly, ethylene glycol, 1,3-propylene glycol, 1,4-butane diol and 1,6-hexane diol are preferable. The aliphatic diols, for example, may be used alone or in combination of two or more.

The straight-chain aliphatic polyester (Y2) is a straight-chain aliphatic polyester obtained by ring-opening polymerization of a cyclic ester. The cyclic ester is, for example, lactone having carbon atoms of 2 to 12. Specific examples thereof include, α-acetolactone, β-propiolactone, γ-butyrolactone and δ-valerolactone. The cyclic esters, for example, may be used alone or in combination with two or more.

The number average molecular weight of the straight-chain aliphatic polyester (Y) is not particularly limited. The lower limit thereof is preferably, for example, 10000 or more, and more preferably 20000 or more. The upper limit thereof is preferably, for example, 200000 or less and more preferably 100000 or less. The aliphatic polyester having a molecular weight within the above range can provide, for example, a more uniform molded body having more excellent dispersibility.

As the number average molecular weight, for example, a value (calibrated by a polystyrene standard sample) obtained by measuring a 0.1% chloroform solution of a sample by GPC can be employed.

By adding a thermoplastic resin having excellent flexibility such as a thermoplastic polyurethane elastomer (TPU) to the cellulose derivative according to an exemplary embodiment, shock resistance can be improved. The addition amount of such a thermoplastic resin (particularly, TPU) is, in view of obtaining sufficient addition effect, preferably 1% by mass or more and more preferably 5% by mass or more relative to the total composition containing the cellulose resin of the exemplary embodiment.

The thermoplastic polyurethane elastomer (TPU) suitable for improving shock resistance that can be used includes a polyurethane elastomer prepared by using a polyol, a diisocyanate and a chain extender.

Examples of the polyol include polyester polyol, polyester ether polyol, polycarbonate polyol and polyether polyol.

Examples of the polyester polyol include a polyester polyol obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a polyol such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,3-octane diol, 1,9-nonane diol, or a mixture of these; and a polylactone diol obtained by ring-opening polymerization of a lactone monomer such as ε-caprolactone.

Examples of the polyester ether polyol include a compound obtained by a dehydration condensation reaction between a polyvalent carboxylic acid such as an aliphatic dicarboxylic acid (succinic acid, adipic acid, sebacic acid, azelaic acid, etc.), an aromatic dicarboxylic acid (phthalic acid, terephthalic acid, isophthalic acid, naphthalene dicarboxylic acid, etc.), an alicyclic dicarboxylic acid (hexahydrophthalic acid, hexahydroterephthalic acid, hexahydroisophthalic acid, etc.), or an acid ester or an acid anhydride of each of these, and a glycol such as diethylene glycol or an alkylene oxide adduct (propylene oxide adduct etc.) or a mixture of these.

Examples of the polycarbonate polyol include a polycarbonate polyol obtained by reacting one or two or more polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol and diethylene glycol with diethylene carbonate, dimethyl carbonate, diethyl carbonate, etc.; and further may include a copolymer of a polycaprolactone polyol (PCL) and a polyhexamethylene carbonate (PHL).

Examples of the polyether polyol include a polyethylene glycol, polypropylene glycol and polytetramethylene ether glycol, each of which is obtained by polymerizing respective cyclic ethers: ethylene oxide, propylene oxide and tetrahydrofuran; and copolyethers of these.

Examples of the diisocyanate to be used in formation of TPU include tolylene diisocyanate (TDI), 4,4'-diphenylmethane diisocyanate (MDI), 1,5-naphthylene diisocyanate (NDI), tolidine diisocyanate, 1,6-hexamethylene diisocyanate (HDI), isophorone diisocyanate (IPDI), xylylene diisocyanate (XDI), hydrogenated XDI, triisocyanate, tetramethyl xylene diisocyanate (TMXDI), 1,6,11-undecane triisocyanate, 1,8-diisocyanatemethyl octane, lysine ester triisocyanate, 1,3,6-hexamethylene triisocyanate, bicycloheptane triisocyanate and dicyclohexyl methane diisocyanate (hydrogenated MDI; HMDI). Of these, 4,4'-diphenylmethane diisocyanate (MDI) and 1,6-hexamethylene diisocyanate (HDI) are preferably used.

Examples of the chain extender to be used in formation of TPU, a low-molecular weight polyol can be used. Examples of the low-molecular weight polyol include aliphatic polyols such as ethylene glycol, 1,3-propylene glycol, 1,2-propylene glycol, 1,3-butane diol, 1,4-butane diol, 1,5-pentane diol, 1,6-hexane diol, 3-methyl-1,5-pentane diol, neopentyl glycol, 1,8-octane diol, 1,9-nonane diol, diethylene glycol and 1,4-cyclohexane dimethanol and glycerin; and aromatic glycols such as 1,4-dimethylolbenzene, bisphenol A and ethylene oxide or a propylene oxide adduct of bisphenol A.

When a silicone compound is copolymerized with a thermoplastic polyurethane elastomer (TPU) obtained from these materials, further excellent shock resistance can be obtained.

These thermoplastic polyurethane elastomers (TPU) may be used singly or in combination.

A method for producing a resin composition containing the cellulose derivative of the exemplary embodiment, additives and a thermoplastic resin, is not particularly limited. For example, the resin composition can be produced by melting and mixing additives and the cellulose resin manually by handmixing or by use of a known mixer such as a tumbler mixer, a ribbon blender, a single-axial or a multi-axial mixing extruder, and a compounding apparatus such as a kneader and kneading roll and, if necessary, granulating the mixture into an appropriate shape. In another preferable process, additives dispersed in solvent such as an organic solvent and a resin are mixed and furthermore, if necessary, a coagulation solvent is added to obtain a mixed composition of the additives and the resin and thereafter, the solvent is evaporated.

The cellulose derivative according to the exemplary embodiments mentioned above can be used as a base resin for a molding material (resin composition). The molding material using the cellulose derivative as a base resin is suitable for forming a molded body such as housing, e.g. packaging for an electronic device.

The base resin herein refers to a main component of the molding material and means that other components may be contained as long as the components do not prevent the function of the main component. The content rate of the main component is not particularly limited; however, the content rate of the main component in a composition is preferably 50% by mass or more, more preferably 70% by mass or more, further preferably 80% by mass or more and particularly preferably 90% by mass or more.

EXAMPLES

The present invention will be more specifically described by way of examples below.

(Synthesis Example 1) Synthesis of Raw Material of Long-Chain Reactant (Carboxylated Hydrogenated Cardanol)

Hydrogenated cardanol (m-n-pentadecylphenol manufactured by ACROS Organics) prepared by hydrogenating an unsaturated bond of the straight-chain hydrocarbon moiety of the cardanol was used as a raw material. The phenolic hydroxy group of the hydrogenated cardanol was reacted with monochloro acetic acid to add a carboxyl group. In this manner, carboxylated hydrogenated cardanol was obtained. More specifically, carboxylated hydrogenated cardanol was prepared in accordance with the following procedure.

First, hydrogenated cardanol (80 g (0.26 mol)) was dissolved in methanol (120 mL). To this, an aqueous solution of sodium hydroxide (64 g (1.6 mol)) dissolved in distilled water (40 mL) was added. Thereafter, a solution of monochloro acetic acid (66 g (0.70 mol), manufactured by Kanto Chemical Co., Inc.) dissolved in methanol (50 mL) was added dropwise at room temperature. After completion of dropwise addition, the reaction solution was refluxed at 73° C. for 4 hours while stirring. After the reaction solution was cooled to room temperature, the reaction solution was acidified with a diluted hydrochloric acid until pH reached 1. To this, methanol (250 mL) and diethylether (500 mL) were added and further distilled water (200 mL) was added. The water layer was separated by a separation funnel and discarded. The ether layer was washed twice with distilled water (400 mL). To the ether layer, anhydrous magnesium was added, dried, and separated by filtration. The filtrate (ether layer) was concentrated under vacuum by an evaporator (90° C./3 mmHg) to obtain a yellow-brown powdery crude product as a solid content. The crude product was recrystallized from n-hexane and dried under vacuum to obtain a white powder of carboxylated hydrogenated cardanol (46 g (0.12 mol)).

(Synthesis Example 2) Synthesis of a Mixture of Short-Chain and Long-Chain Reactants The carboxylated hydrogenated cardanol of Synthesis Example 1 was mixed with an acetic anhydride and heated to obtain a mixture of the acetic anhydride, acetic acid-carboxylated hydrogenated cardanol mixed acid anhydride (asymmetric anhydride: acid anhydride formed by a dehydration reaction between acetic acid and carboxylated hydrogenated cardanol) and acid anhydride-modified cardanol (symmetric anhydride: acid anhydride formed by a dehydration reaction between mutual carboxylated hydrogenated cardanol molecules). In short, a mixture of short-chain and long-chain reactants was obtained. More specifically, the mixture of short-chain and long-chain reactants was prepared in accordance with the following procedure.

To the carboxylated hydrogenated cardanol (40.2 g (111 mmol)) of Synthesis Example 1, acetic anhydride (21.0 mL (222 mmol)) was added. The mixture was stirred while heating at 100° C. for one hour. In this manner, a mixture of short-chain and long-chain reactants was obtained.

The resultant mixture of short-chain and long-chain reactants was dissolved in deuterated chloroform and measured by $^1$H-NMR (product name: AV-400, 400 MHz, manufactured by Bruker). As a result, the molar ratio of acetic anhydride:acetic acid-carboxylated hydrogenated cardanol mixed anhydride (asymmetric anhydride):acid anhydride-modified cardanol (symmetric anhydride) was 65:32:3.

Note that, the obtained acetic acid-carboxylated hydrogenated cardanol mixed acid anhydride (asymmetric anhydride) has carbon atoms of 25, the acid anhydride-modified cardanol (symmetric anhydride) has carbon atoms of 46, and the long-chain organic group (carboxylated hydrogenated cardanol bound to a hydroxy group of cellulose via ester bond) produced in Example described later has carbon atoms of 23.

(Synthesis Example 3) Synthesis of Long-Chain Reactant (Acid Chloride Modified Hydrogenated Cardanol)

The carboxylated hydrogenated cardanol synthesized in Synthesis Example 1 was chlorinated with oxalyl chloride to convert a carboxyl group into an acid chloride group to obtain acid chlorinated hydrogenated cardanol. More specifically, the acid chlorinated hydrogenated cardanol was prepared in accordance with the following procedure.

The carboxylated hydrogenated cardanol (46 g (0.12 mol)) of Synthesis Example 1 was dissolved in dehydrated chloroform (250 mL) and oxalyl chloride (24 g (0.19 mol)) and N, N-dimethylformamide (0.25 mL (3.2 mmol)) were added. The mixture was stirred for 72 hours at room temperature. Chloroform, excessive oxalyl chloride and N, N-dimethylformamide were distillated away under reduced pressure to obtain acid chlorinated and hydrogenated cardanol (48 g (0.13 mol)).

Note that the obtained long-chain reactant (acid chloride modified cardanol) has 23 carbon atoms. The long-chain organic group (carboxylated hydrogenated cardanol bound to a hydroxy group of a cellulose via an ester bond) to be produced in Comparative Example (described later) has 23 carbon atoms.

(Reference Example 1) Reaction in Solid-Liquid Heterogeneous System (Corresponding to the First Step of Example 1)

After activation treatment of a cellulose was performed, a mixture of short-chain and long-chain reactants of Synthesis Example 2 was reacted in a solid-liquid heterogeneous system to obtain a long-chain and short-chain linked cellulose derivative. More specifically, the long-chain and short-chain linked cellulose derivative was prepared in accordance with the following procedure.

First, an activation treatment of a cellulose was performed by the following method.

A cellulose (product name: KC flock, bland: W-50GK, manufactured by NIPPON PAPER INDUSTRIES Co., Ltd.) (6.0 g) (on a dry basis) was dispersed in dimethylsulfoxide (90 mL). The dispersion solution was stirred for 1 hour and subjected to suction filtration for 10 minutes to remove dimethylsulfoxide. In this manner, the cellulose activated was obtained.

Next, a cellulose derivative was synthesized by the following method.

To the above cellulose activated, a dioxane solution of dimethylaminopyridine (3.0 g) dissolved in dehydrated dioxane (150 mL) was added to obtain a dispersion solution. The dispersion solution was added to the mixture of short-chain and long-chain reactants of Synthesis Example 2.

After the resultant solution was stirred while heating at 100° C. for 6 hours, the reaction suspension solution was subjected to suction filtration to perform solid-liquid separation. The solid content obtained as a residue was washed and dried to obtain a product (11.2 g). Washing was repeatedly performed so as not to leave an unreacted substance in consideration of analysis. More specifically, washing was made three times with 100 mL of isopropyl alcohol heated at 60° C. The solid content washed was dried in vacuum at 105° C. for 5 hours.

A part of the resultant solid content (long-chain and short-chain linked cellulose derivative) was treated for analysis as follows. First, to the solid content (0.3 g), a pyridine solution containing dimethyl amino pyridine (1.0 g) dissolved in dehydrated pyridine (20 mL) was added and further propionic anhydride (32 ml) was added. After the mixture was stirred while heating at 100° C. for 3 hours, a water-methanol mixed solution (volume ratio 1:1) (550 ml) was slowly added dropwise to make reprecipitation. The solid substance was separated by filtration. The solid substance obtained by reprecipitation was washed three times with a water-methanol mixed solution (volume ratio 1:1) (50 ml) and dried in vacuum at 105° C. for 5 hours. In the treatment mentioned above, the remaining hydroxy groups of the solid content (long-chain and short-chain linked cellulose derivative) were converted to propionyl groups. In this manner, the solid content was modified so as to be dissolved in deuterated chloroform.

The solid content modified was dissolved in deuterated chloroform and the substitution degree of hydroxy groups was measured by $^1$H-NMR (product name: AV-400, 400 MHz, manufactured by Bruker) to evaluate the substitution degree of hydroxy groups of the solid content before modification. As a result, the substitution degree ($DS_{SH}$) of the solid content (long-chain and short-chain linked cellulose derivative) with the short-chain organic group before modification was 1.0; whereas, the substitution degree ($DS_{LO}$) thereof with the long-chain organic group was 0.3 and the hydroxy group remaining degree was 1.7.

To the filtrate obtained by solid-liquid separation, a large amount of poor solvent, methanol, was added for analysis. The resultant precipitated solid substance was repeatedly washed with isopropyl alcohol at 60° C. and the ratio of a cellulose derivative dissolved in the reaction solution was calculated. As the result, the ratio was 5%.

The process chart of Reference Example 1 is shown in FIG. 1 (corresponding to the first step of Example 1).

Example 1

First, an intermediate cellulose derivative was prepared in the same manner as in Reference Example 1 (first step).

Next, to the obtained intermediate cellulose derivative (11 g), pyridine (74 ml) and acetic anhydride (86 ml) were added and stirred while heating at 100° C. for 4 hours (second step).

Thereafter, the reaction solution was distilled away to obtain the final cellulose derivative.

The substitution degree of hydroxy groups in the resultant solid content (long-chain and short-chain linked cellulose derivative) was measured by NMR in the same manner as in Reference Example 1. As a result, the substitution degree ($DS_{SH}$) with a short-chain organic group was 1.5, the substitution degree ($DS_{LO}$) with a long-chain organic group was 0.3 and the hydroxy group remaining degree was 1.2. The manufacturing process chart of Example 1 is shown in FIG. 1.

Example 2

A long-chain and short-chain linked cellulose derivative was prepared in the same manner as in Example 1 except that the heating time in the second step was set to be 18 hours. The substitution degree of hydroxy groups of the resultant solid content (long-chain and short-chain linked cellulose derivative) was measured by NMR in the same manner as in Reference Example 1. As a result, the substitution degree ($DS_{SH}$) with a short-chain organic group was 2.4, the substitution degree ($DS_{LO}$) with a long-chain organic group was 0.3 and the hydroxy group remaining degree was 0.3. The manufacturing process chart of Example 2 is shown in FIG. 1.

Example 3

First, an intermediate cellulose derivative was prepared in the same manner as in Reference Example 1 (first step).

Next, to the obtained intermediate cellulose derivative (11 g), pyridine (74 ml), acetic anhydride (86 ml) and dimethyl amino pyridine (3.0 g) were added and stirred while heating at 100° C. for 6 hours (second step).

Thereafter, while stirring the reaction solution, methanol (740 mL) was slowly added dropwise to reprecipitate a solid substance. The solid substance was separated by filtration. The solid content thus obtained was dried overnight in the air and further dried in vacuum at 105° C. for 5 hours to obtain a long-chain and short-chain linked cellulose derivative.

The substitution degree of hydroxy groups of the resultant solid content (long-chain and short-chain linked cellulose derivative) was measured by NMR in the same manner as in Reference Example 1. As a result, the substitution degree ($DS_{SH}$) with a short-chain organic group was 2.7, the substitution degree ($DS_{LO}$) with a long-chain organic group was 0.3 and the hydroxy group remaining degree was less than 0.1.

(Comparative Example 1) Reaction in Homogenous System

Acid chlorinated hydrogenated cardanol of Synthesis Example 3 and cellulose acetate (trade name: LM-80, manufactured by Daicel Chemical Industries, Ltd., the number of acetic acid molecules added per glucose unit of cellulose (substitution degree by acetylation: $DS_{Ace}$)=2.1) were reacted in a solution state. The reaction solution was added to a poor solvent to precipitate a product. In this manner, a long-chain and short-chain linked cellulose derivative was obtained. More specifically, a long-chain and short-chain linked cellulose derivative was prepared as follows.

Cellulose acetate (10 g) (the amount of hydroxy group: 0.036 mol) was dissolved in dehydrated dioxane (200 mL). A triethylamine (5.0 mL (0.036 mol)) serving as a reaction catalyst and an acid-trapping agent was added. To this solution, a dioxane solution (100 mL) dissolving the acid chlorinated hydrogenated cardanol (23 g (0.054 mol)) of Synthesis Example 3 was added and stirred while heating at 100° C. for 5 hours. The reaction solution was slowly added dropwise to methanol (3 L) while stirring to reprecipitate a solid substance. The solid substance was separated by filtration. The solid content thus obtained was dried overnight in the air and further dried in vacuum at 105° C. for 5 hours to obtain a long-chain and short-chain linked cellulose derivative (16 g).

Figure 2:
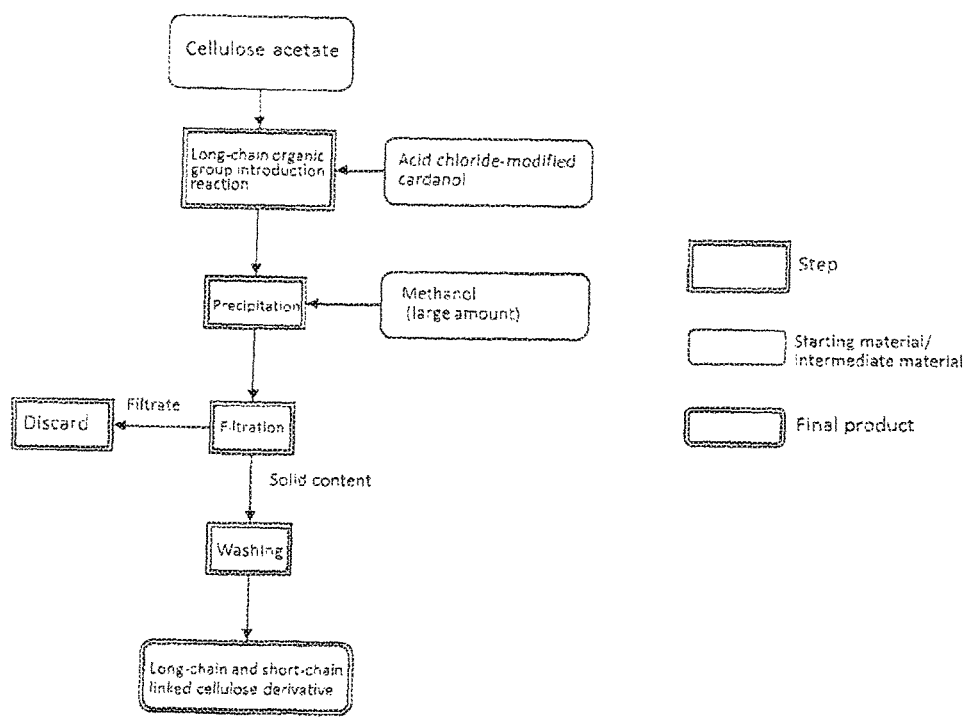
FIG. 2 is a process chart of a Production Example of a cellulose derivative according to related art.

The substitution degree ($DS_{LO}$) of the resultant long-chain and short-chain linked cellulose derivative with a long-chain organic group was measured by NMR. As a result, the substitution degree ($DS_{LO}$) was 0.5. The manufacturing process chart of Comparative Example 1 is shown in FIG. 2.

[Evaluation of Melt Flow Rate (MFR)]

With respect to each of the cellulose derivatives of Examples 1 to 3, Reference Example 1 and Comparative Example 1, a melt flow rate serving as an index for flowability was evaluated as follows. The results are summarized in Table 1.

After a cellulose derivative was dried at 105° C. for 7 hours, a melt flow rate (MFR) was measured by use of a measuring device (trade name: Shimadzu flow tester CFT-500D, manufactured by Shimadzu Corporation) in accordance with JIS K7210 in the conditions: 200° C., 500 kgf/cm² (49 MPa).

[Amount of Solvent]

The amounts of solvents used in producing cellulose derivatives in Reference Example 1, Examples 1 to 3 and Comparative Example 1 are summarized in Table 1. The amounts of solvents in Table 1 are shown by mass ratio (shown below). In Reference Example 1, the amount of solvent used in introducing long-chain and short-chain organic groups is shown by mass ratio to the starting cellulose. In Examples 1 to 3, the total amount of solvent used in introducing long-chain and short-chain organic groups and solvent used in subsequent introduction of a short-chain organic group is shown by a mass ratio to a staring cellulose. However, the amount of solvent in Example 3 includes the amount of methanol used in reprecipitation. In Comparative Example 1, the total amount of solvent used in introducing a long-chain organic group and solvent used in reprecipitation is shown by a mass ratio to the starting cellulose acetate.

TABLE 1

| | Reference Example 1 | Example 1 | Example 2 | Example 3 | Comparative Example 1 |
|---|---|---|---|---|---|
| Reaction system in introducing a long-chain organic group | Heterogeneous system | Heterogeneous system | Heterogeneous system | Heterogeneous system | Homogeneous system |
| Presence or absence of second step | Absent | Present | Present | Present | — |
| $DS_{SH}$ (short-chain) | 1.0 | 1.5 | 2.4 | 2.7 | 2.1 |
| $DS_{LO}$ (long-chain) | 0.3 | 0.3 | 0.3 | 0.3 | 0.5 |
| Hydroxy group remaining degree | 1.7 | 1.2 | 0.3 | <0.1 | 0.4 |
| Amount of solvent (mass ratio to cellulose) | 26 | 38 | 38 | 161 | 269 |
| MFR (g/10 min) | 20 | 490 | 640 | 40 | 600 |

As is apparent from comparison between the production steps shown in FIG. 1 and those shown in FIG. 2, as well as from Table 1, since a large amount of poor solvent is not required in recovering a product in Examples 1, 2 and Reference Example 1, compared to Comparative Example 1, the amount of solvent used is greatly low and the recovery step is simplified. Also, in Example 3, since the amount of reaction solvent in the second step is low and the amount of solvent (poor solvent) used in reprecipitation is low, compared to Comparative Example 1, the recovery process is simplified. Note that, in the second steps of Examples 1 to 3, since a short-chain reactant having less steric hindrance is reacted, the degree of swelling and solubility of a cellulose derivative in a reaction solution can be reduced, compared to the case where a long-chain reactant having large steric hindrance is reacted. Because of this, the use amount of reaction solution can be reduced.

In Examples 1 to 3, since a short-chain organic group is further introduced in the second step, it is found that flowability is improved compared to Reference Example 1. Of them, improvement of flowability is significant particularly when the hydroxy group remaining degree is less than 1.7, as is in Examples 1 and 2. Particularly, in Examples 1 and 2, although the introduction amount ($DS_{LO}$) of a long-chain organic group is the same as in that of Reference Example 1, flowability is improved.

Note that, the hydroxy group remaining degree is less than 0.1 in Example 3; however, flowability is low compared to Examples 1 and 2. It can be presumed that the ratio of a short-chain linked cellulose relatively low in flowability is high.

[Evaluation by X-Ray Diffraction]

The crystal structure of the obtained cellulose derivative was evaluated by X-ray diffraction. As an X-ray diffractometer, X'Pert PRO (trade name) manufactured by PANalytical was used. As X-ray, CuKα beam was used. A cellulose derivative was pressed at 200° C. and 100 kgf/cm² (9.8 MPa) into a film and evaluated, or a cellulose derivative synthesized and recovered as a solid substance is directly evaluated.

Figure 3:
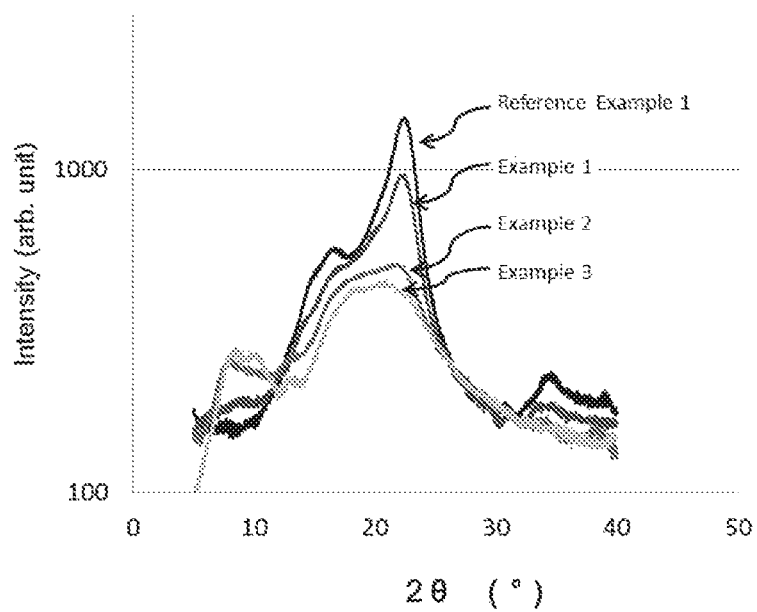
FIG. 3 is a graph showing evaluation results of cellulose derivatives of Examples and Reference Example by X-ray diffraction.
Figure 4:
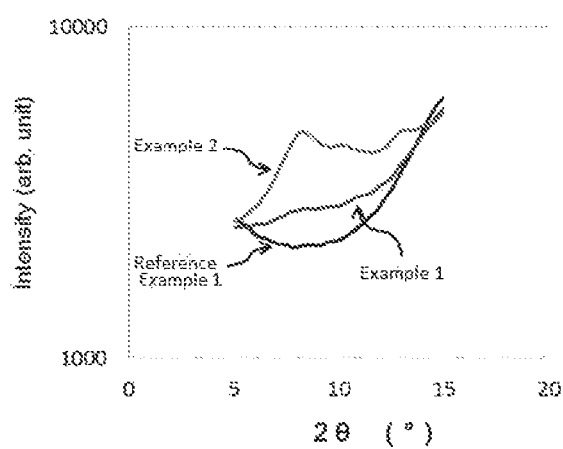
FIG. 4 is a graph showing evaluation results of cellulose derivatives of Examples and Reference Example by X-ray diffraction.

Evaluation results are shown in FIG. 3 and FIG. 4. FIG. 4 shows the measurement results with respect to Examples 1 and 2 and Reference Example 1 by repeating measurement for many times particularly, in a low-angle region. In all cases, film-form samples were evaluated.

As is apparent from FIG. 3, a cellulose derivative (corresponding to the cellulose derivative obtained in the first step of Example 1) of Reference Example 1 has cellulose crystal (peak in the vicinity of 2θ=22°). The symbol θ herein represents the incident angle of X-ray on a measurement sample.

However, as is apparent form the results of Examples 1 to 3, as the number of short-chain organic groups to be introduced is increased, cellulose crystal disappears (FIG. 3); at the same time, crystal of cellulose acetate is newly formed (in FIG. 4, peaks in the vicinity of 2θ=8°, 10°, 13°). Note that, cellulose triacetate crystal has polymorphisms called as CTA-I and CTA-II. It is known that CTA-I has a peak in the vicinity of 2θ=8° and CTA-II has peaks in the vicinity of 2θ=8°, 10°, 13°.

Also when the cellulose derivative of Example 3, which was synthesized and recovered as a solid substance, was directly evaluated without being formed into a film, a peak was observed in the vicinity of 2θ=8° and the presence of cellulose acetate crystal was confirmed.

[Degree of Swelling and Measurement Method Thereof]

Degrees of swelling of samples (cellulose derivatives) were measured as follows.

After the length of a sample (after dried) before swollen was measured by an optical microscope, a solvent was added dropwise to soak the sample in the solvent. In the state where the sample was soaked in the solvent, the length of the sample was measured with time. The length of the sample after the swelling reached saturation was regarded as the length of the sample after swollen and degree of swelling was calculated in accordance with the following expression.

Degree of swelling (%)=100×(length of sample after swollen−length of sample before swollen)/length of sample before swollen.

More specifically, first, a sample before swollen (after dried) was placed on a glass plate and the length (width of a fiber in this case) of the sample before swollen was measured under observation by an optical microscope (trade name: digital microscope, model: VHX-500, manufactured by KEYENCE CORPORATION).

The length of a sample herein is determined by measuring the distance between two points (end points): two points at which a line passing through the center of the sample is crossed with the contour of the sample, in an image under observation. The shortest distance was determined as the length of the sample. If the sample is fibrous form, the center of the sample corresponds to any point on the center axis along the longitudinal direction. If the sample is spherical form, the center of the sample corresponds to the center of the circle (contour) in an image under observation. If the sample has a shape except fibrous form and spherical form, in an image under observation, the contour of a single particle of the sample is surrounded by a square (a rectangular or square) having the smallest area having four corners all having an angle of 90° and the intersection of the diagonal lines of the square can be determined as the center of the sample. If the sample is fibrous form, the diameter (width) of the fiber correspond to the length of sample. If the sample is spherical form, the diameter corresponds to the length of the sample.

The degree of swelling of cellulose derivatives of Reference Example 1 was determined at room temperature in accordance with the aforementioned measurement method. Since the sample was fibrous, the diameter (width) of the fiber was measured. Since the swelling of the sample reached saturation within one minute from soaking in solvent, degree of swelling was evaluated at one minute after soaking in the solvent. Note that the length 10 minutes after soaking in the solvent was virtually the same as the length one minute after soaking in the solvent. The obtained results are shown in Table 2.

TABLE 2

|  | Degree of swelling (%) | |
| --- | --- | --- |
|  | Dioxane | Methanol |
| Long-chain and short chain linked cellulose derivative (Reference Example 1) | 25 | 5 |

As is shown in Table 2, the long-chain and short-chain linked cellulose derivative of Reference Example 1 exhibits a high degree of swelling in dioxane compared to methanol (poor solvent). As is shown in the results (Table 1) of Reference Example 1, high substitution degree is obtained. Likewise, if a reaction solution capable of attaining high degree of swelling of a long-chain and short-chain linked cellulose derivative is used, it is probably that the cellulose derivative is sufficiently impregnated with a long-chain reactant and the swollen state can be maintained until completion of the reaction, and consequently high reactivity is obtained.

Now, production of a molded body and evaluation results of the obtained molded body will be shown below.

Reference Example 2

Using the cellulose derivative obtained in Reference Example 1, a molded body was prepared by adding an additive as described as follows and physical properties of the molded body were evaluated. As the additive, a straight-chain polyester for improving flexibility was used.

[Kneading Method]

Using a kneader (trade name: HAAKE MiniLab Rheomex CTWS, manufactured by Thermo Electron Corporation), a cellulose derivative (3.75 g) and polybutylene succinate adipate (trade name: BIONOLLE 3001MD manufactured by Showa Denko K.K.)(3.75 g) were kneaded. At this time, the temperature of the kneading chamber of the kneader was set at 210° C. and the rotation number was set at 60 rpm. The raw materials were supplied from a supply port of the kneader and kneaded for 3 minutes.

[Molding Method]

Using an injection molding machine (trade name: HAAKE MiniJet II, manufactured by Thermo Electron Corporation), a molded body having the following shape was prepared using the above resin composition.

The size of the molded body: thickness: 4 mm, width: 10 mm, length: 80 mm

At this time, molding conditions were set as follows: the temperature of cylinder of the molding machine: 220° C., the temperature of a mold: 60° C., injection pressure: 1200 bars (120 MPa), injection time: 5 seconds, and a pressure of 600 bar (60 MPa) was kept for 20 seconds.

[Evaluation of Compatibility]

Appearance of a molded body obtained was visually observed and compatibility was evaluated based on the following criteria.

◉: transparent or semitransparent
○: clouded (homogeneously dispersed)
x: non-homogeneously dispersed.

[Measurement of Izod Impact Strength]

Notch izod impact strength of the above molded body was measured in accordance with JIS K7110.

Example 4

A molded body was prepared using the cellulose derivative obtained in Example 2 in the same manner as in Reference Example 2 and physical properties thereof were evaluated.

Example 5

A molded body was prepared using the cellulose derivative obtained in Example 3 in the same manner as in Reference Example 2 and physical properties thereof were evaluated.

The evaluation results of Examples 4, 5 and Reference Example 2 are summarized in Table 3.

TABLE 3

|  | Example 4 | Example 5 | Reference Example 2 |
| --- | --- | --- | --- |
| Reaction system in introducing a long-chain organic group | Heterogeneous system | Heterogeneous system | Heterogeneous system |
| Presence or absence of second step | Present | Present | Absent |
| $DS_{SH}$ (short-chain) | 2.4 | 2.7 | 1.5 |
| $DS_{LO}$ (long-chain) | 0.3 | 0.3 | 0.3 |
| Hydroxy group remaining degree | 0.3 | <0.1 | 1.2 |
| Compatibility | ◉ | ◉ | ○ |
| Izod impact strength (kJ/m$^2$) | 12 | 72 (not broken) | 3 |

As is apparent from Table 3, cellulose derivatives of Examples 4 and 5 have excellent compatibility with the additive compared to that of Reference Example 2. This is probably because the number of crosslinking sites low in compatibility and derived from the hydrogen bonds of hydroxy groups is reduced by introducing a short-chain organic group in the second step. In addition, the impact strength of Examples 4 and 5 is high compared to Reference Example 2. This is because polybutylene succinate adipate added as a flexible component was sufficiently dissolved and thus the flexibility of the entire resin composition was improved.

Having thus described the present invention with reference to the exemplary embodiments and Examples, the present invention is not limited to the above-described exemplary embodiments and Examples. Various modifications understandable to those skilled in the art may be made to the constitution and details of the present invention within the scope thereof.

This application claims the right of priority based on Japanese Patent Application No. 2013-222565 filed Oct. 25, 2013, the entire content of which are incorporated herein by reference.

The invention claimed is:

1. A process for producing a cellulose derivative, comprising:
   a first step including
      reacting a cellulose and a first reactant comprising a long-chain reactant for reacting with a hydroxy group of the cellulose to introduce a long-chain organic group having 5 or more carbon atoms, in a solid-liquid heterogeneous system, to form a first cellulose derivative in a swollen state, the first cellulose derivative having the long-chain organic group having 5 or more carbon atoms introduced therein and having a part of hydroxy groups of the cellulose remained, and
      separating the first cellulose derivative in the swollen state from the liquid phase of the solid-liquid heterogeneous system without conducting precipitation with a solvent that poorly dissolves the first cellulose derivative for the first cellulose derivative, to obtain the first cellulose derivative as an intermediate; and
   a second step including reacting the first cellulose derivative and a second reactant comprising a short-chain reactant for reacting with a remaining hydroxy group of the first cellulose derivative to introduce a short-chain organic group having 4 or less carbon atoms to form a second cellulose derivative having the short-chain organic group having 4 or less carbon atoms introduced therein.

2. The process for producing a cellulose derivative according to claim 1, wherein the first cellulose derivative in a swollen state has a degree of swelling within a range of 10 to 300%.

3. The process for producing a cellulose derivative according to claim 1,
   wherein the first reactant further comprises a short-chain reactant for reacting with a hydroxy group of the cellulose to introduce a short-chain organic group having 4 or less carbon atoms, and
   the first cellulose derivative further comprises the short-chain organic group having 4 or less carbon atoms introduced therein.

4. The process for producing a cellulose derivative according to claim 1, wherein the first reactant comprises a cardanol derivative or a derivative of a hydrogenated cardanol as the long-chain reactant.

5. The process for producing a cellulose derivative according to claim 1, wherein the short-chain reactant of the second reactant is a short-chain acylating agent for introducing a short-chain acyl group having 2 to 4 carbon atoms.

6. The process for producing a cellulose derivative according to claim 1, wherein, in the second step, the second cellulose derivative is recovered as a solid content by removing a reaction solution by distillation.

7. The process according to claim 1, wherein a solubility of the cellulose derivative in a solution liquid in the first step is 10% by mass or less.

8. The process according to claim 1, wherein a solubility of the cellulose derivative in a solution liquid in the first step is 8% by mass or less.

9. The process according to claim 1, wherein an average number of hydroxy groups per glucose unit of the final cellulose derivative is less than 0.5.

10. The process according to claim 1, wherein an average number of the short-chain organic groups introduced per glucose unit of the final cellulose derivative is 1.3 to 2.7.

11. The process according to claim 1, wherein an average number of the long-chain organic groups introduced per glucose unit of the final cellulose derivative is 0.1 to 1.0.

12. The process according to claim 1, wherein the long-chain organic group includes a long-chain organic group having 7 to 48 carbon atoms.

* * * * *